(12) United States Patent
Castoldi et al.

(10) Patent No.: US 6,785,434 B2
(45) Date of Patent: Aug. 31, 2004

(54) ATTENUATOR INTEGRATED WITH MODULATOR AND TRANSMITTING MODULE FOR WDM SYSTEMS USING THE SAME

(75) Inventors: Andrea Castoldi, Monza (IT); Flavio Dell'orto, Sergeno (IT); Davide Sciancalepore, Caluso (IT)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/168,841

(22) PCT Filed: Jan. 9, 2001

(86) PCT No.: PCT/EP01/00187
§ 371 (c)(1),
(2), (4) Date: Jun. 20, 2002

(87) PCT Pub. No.: WO01/54318
PCT Pub. Date: Jul. 26, 2001

(65) Prior Publication Data
US 2002/0191886 A1 Dec. 19, 2002

(30) Foreign Application Priority Data
Jan. 17, 2000 (EP) .......................................... 00100832

(51) Int. Cl.⁷ ............................ G02B 6/12; G02B 6/00; G02F 1/035
(52) U.S. Cl. .............................. 385/14; 385/2; 385/140

(58) Field of Search ............................ 385/2, 3, 14, 45, 385/140, 8; 359/245, 276, 278, 279

(56) References Cited

U.S. PATENT DOCUMENTS

| | | | | |
|---|---|---|---|---|
| 4,300,814 A | * | 11/1981 | Carenco | 385/132 |
| 5,249,243 A | * | 9/1993 | Skeie | 385/3 |
| 5,970,201 A | * | 10/1999 | Anthony et al. | 385/140 |
| 6,400,483 B1 | * | 6/2002 | Mueller-Fiedler et al. | 398/194 |
| 6,493,478 B1 | * | 12/2002 | DeRosa et al. | 385/16 |

FOREIGN PATENT DOCUMENTS

EP          0905536 A2  *  3/1999  ............ G02B/6/42

* cited by examiner

Primary Examiner—Edward J. Glick
Assistant Examiner—Thomas R Artman
(74) Attorney, Agent, or Firm—Moser, Patterson & Sheridan, L.L.P.

(57) ABSTRACT

An optical device integrated on a planar substrate is disclosed, comprising a Y-branch attenuator optically coupled to a Mach-Zehnder modulator. The device also comprises means for reducing a crosstalk caused by unguided radiation between the Y-branch attenuator and the Mach-Zehnder modulator. In one embodiment, the reduction of the crosstalk is obtained by connecting the Mach-Zehnder modulator to one arm of the Y-branch attenuator. The invention also comprises a transmitting module including the integrated device.

21 Claims, 12 Drawing Sheets

ATTENUATOR INTEGRATED WITH MODULATOR AND TRANSMITTING MODULE FOR WDM SYSTEMS USING THE SAME

TECHNICAL FIELD

This invention relates to an integrated optical device to be included in a transmitter for an optical fibre transmission system. In particular, this invention relates to a modulator with integrated attenuator to be included in a transmitter for a WDM optical fibre transmission system based on erbium doped fibre amplifiers, using pre-adjusting of the channel powers. Further, this invention relates to a method for reducing crosstalk between devices integrated on a substrate.

BACKGROUND OF THE INVENTION

There is a considerable interest in using erbium doped fibre amplifiers (EDFA) to amplify weak optical signals for both local and trunk optical communications networks. The rare earth doped optical amplifying fibres are low in cost, exhibit low noise, provide relatively large bandwidth which is not polarization dependent, display substantially reduced crosstalk problems and present low insertion losses at the relevant operating wavelengths which are used in optical communications.

A particular area of current concern is that of increasing the capacity of an existing optical fibre communication system. Recent advances in erbium doped fibre amplifier technology suggests that increased capacity can be best obtained with wavelength division multiplexing (WDM) channels.

A major problem in implementing WDM channels on an optical transmission system is the absence of gain equalization. More specifically, because of non-uniform wavelength-dependent gain profile and saturation characteristics of optical fibre amplifiers, such as erbium doped fibre amplifiers, each channel in a WDM system will experience a different optical gain which, in turn, can result in an excessive bit error rate for channels with low gain.

A solution to this problem is indicated in U.S. Pat. No. 5,225,922 to AT&T Bell Laboratories, that discloses an optical transmission system in which the output powers and the signal-to-noise ratios of the channels of a WDM system are selectively equalized by adjusting the optical input signal powers. The power adjusters can be either optical amplifiers or optical attenuators or any device which can be used to selectively increase or decrease the power of the signal of each channel.

Integrated optics devices based on lithium niobate technology are well known in the field of WDM systems (see for example S. Bosso, *Applications of lithium niobate integrated optic in telecommunication systems*, Proc. SPIE Vol. 3620, p 34–37, Integrated Optics Devices III—The International Society for Optical Engineering, March/1999).

Optical modulators are among the most commonly used integrated optical components. They function by controlling the amount of light transmitted into a fibre optic link from a continuous wave (CW) laser, which emits polarized light. A commonly used optical modulator for digital applications consists of a Mach-Zehnder interferometric waveguide structure, having two Y-junctions and two waveguide arms between them, integrated on a lithium niobate substrate with travelling wave electrodes. Optimization efforts have been performed over the last years to reduce the driving voltage of digital Mach-Zehnder modulators and typical values of 3–4 V driving voltage (at 2.5 Gbit/s) are now reproducibly achieved on commercial devices. Recently, new devices have been introduced, integrating on the same lithium niobate substrate a variable attenuator with the modulator, in order to perform the adjusting of the power-per-channel for compensating EDFA gain shape.

An example is the "OC192, Integrated 10 Gb/s Amplitude Modulator & Attenuator", sold by SDL Integrated Optics, Model IOAP-MOD9189-F-F-O.

According to the data sheet by SDL Integrated Optics dated Sep. 24, 1999, this modulator has the benefit of a low drive voltage for ease of use with a wide range of commercially available drivers. With regards to the attenuation port, the same data sheet reports a value of driving voltage comprised between 8V and 12V.

Another example is the "10 Gb/s Data Modulator with Integrated Variable Optical Attenuator (VOA)", sold by JDS Uniphase, Model 10150-002193.

According to the data sheet by JDS Uniphase dated November/1999, this modulator has a driving voltage for the VOA section not higher than 4V.

Y-branch electrooptical attenuators are known in the art. Generally speaking, these devices comprise a Y-branch waveguide structure with electrodes deposited near the waveguides. Typical voltages applied to the electrodes are higher than 15–20 V and can reach up to 30–50 V.

U.S. Pat. No. 5,970,201 to Lucent Technologies discloses a circuit for regulating optical power levels. Electrooptic Y-branched attenuators are used to control optical output intensity by means of feedback loops from the outputs of the Y-branch attenuators to the electrodes of the attenuators, which determine the amount of light going to the outputs The problem faced by the above patent is to obtain a polarization independent attenuator which can be inserted in an optical network for controlling the power of optical signals having random variations in the state of polarization, as in optically amplified transmission systems when one or several wavelength channels are added or dropped. The use of a fast feedback loop together with a Y-branch attenuator allows to obtain a polarization independent automatic power controlling device, which can be used in combination with an optical switch array.

SUMMARY OF THE INVENTION

Applicant has realized a modulator with integrated attenuator by using a Y-branch attenuator integrated on the same substrate of a Mach-Zehnder modulator.

Applicant has found that the high driving voltage of a Y-branch attenuator is not a critical issue for the integration of the Y-branch attenuator on the same substrate of the Mach-Zehnder modulator.

Applicant has found that, in order to meet the requirements of a WDM system using pre-equalization of the channels, a critical issue for an electro-optical device comprising a Mach-Zehnder modulator and a Y-branch attenuator integrated on the same substrate is the reduction of crosstalk between the two integrated devices. Such crosstalk is caused by portions of unguided optical power spread on the substrate starting from waveguide sections belonging to the upstream device, which optical power is then re-guided by waveguide sections belonging to the downstream device.

In this respect, Applicant has found that particular arrangements of the Y-branch attenuator with respect to the Mach-Zehnder modulator can effectively reduce the crosstalk between the two devices, whereas other arrangements suffer from crosstalk up to values that are unacceptable for a WDM system.

In particular, Applicant has found that a configuration comprising a Mach-Zehnder modulator coupled to one of the arms of the Y-branch attenuator effectively reduces the crosstalk between the two integrated devices, with respect to a configuration comprising a Mach-Zehnder modulator coupled to the common waveguide of the Y-branch attenuator.

Applicant has also found that the use of a tilted Y-branch attenuator effectively reduces the crosstalk.

Applicant has also found that means for filtering and/or "quick spreading" the portion of optical power radiated on the substrate between the two integrated devices can be effectively implemented for reducing the crosstalk.

In one aspect, the invention relates to an integrated optical device comprising:
  a planar substrate,
  a Mach-Zehnder modulator integrated on said substrate
  a Y-branch optical attenuator integrated on said substrate to provide an attenuation range, said Y-branch attenuator being optically coupled to said Mach-Zehnder modulator, and
  means for reducing a crosstalk between said Y-branch attenuator and said Mach-Zehnder modulator, whereby the extinction ratio of the optical device is at least 18 dB on an attenuation range of at least 6 dB.

Preferably, the extinction ratio of the optical device is at least 20 dB on the attenuation range.

In one embodiment, the Mach-Zehnder modulator is optically coupled to one arm of the Y-branch attenuator.

In an alternative embodiment, the Mach-Zehnder modulator is optically coupled to the common waveguide of the Y-branch attenuator The means for reducing the crosstalk may comprise disposing one arm of said Y-branch attenuator parallel with respect to a longitudinal direction.

The means for reducing the crosstalk may comprise a filter of an unguided radiation spreading on said substrate, the filter being arranged in a region between said Y-branch attenuator and said Mach-Zehnder modulator.

Such a filter may comprise metal strips disposed on the side of a connecting optical waveguide coupling the Y-branch attenuator and the Mach-Zehnder modulator.

A gap between the metal strips can be about 170% of the MFD of said connecting optical waveguide.

In an example, the length of the metal strips is about 4 mm.

Advantageously, the metal strips are integrated in an extension of the electrodes of the Y-branch attenuator, so that the gap between the electrodes progressively increases from about 100% to about 170% of the MFD of the connecting waveguide in a first portion of the extension and is about 170% of the MFD of the connecting waveguide in a second portion of the extension.

The means for reducing the crosstalk may comprise waveguides for the Y-branch attenuator having a width lower between 5% and 16% with respect to the width of the waveguides of the Mach-Zehnder modulator.

Preferably, the width of the waveguides of the Y-branch attenuator is 8% less than the width of the waveguides of the Mach-Zehnder modulator.

In a second aspect, the invention relates to an integrated optical device comprising:
  a substrate,
  a Mach-Zehnder modulator integrated on said substrate
  a Y-branch attenuator integrated on said substrate,
  said Mach-Zehnder modulator being optically coupled to one arm of said Y-branch attenuator.

In a third aspect, the invention relates to a method for reducing the crosstalk between at least two devices including optical waveguides integrated on a substrate, each of said optical devices including at least one multimodal section of optical waveguide, the crosstalk being generated by unguided optical radiation propagating on said substrate in a region comprised between said optical devices, said method comprising filtering said unguided radiation in said region.

In a fourth aspect, the invention relates to a transmitting module comprising:
  a laser source for emitting an optical signal,
  an integrated optical device for modulating the intensity of said optical signal, comprising a Mach-Zehnder modulator formed on a substrate,
  a Y-branch optical attenuator formed on the same substrate, optically coupled to said modulator, to provide an attenuation range, and
  means for reducing a crosstalk between said Y-branch attenuator and said Mach-Zehnder modulator, whereby the extinction ratio of the optical device is at least 18 dB on an attenuation range of at least 6 dB In a fifth aspect, the invention relates to a transmitting module comprising:
  a laser source for emitting an optical signal,
  an integrated optical device for modulating the intensity of said optical signal, comprising a Mach-Zehnder modulator formed on a substrate,
  and a Y-branch optical attenuator formed on said substrate,
  said Mach-Zehnder modulator being optically coupled to one arm of said Y-branch attenuator.

Preferably, the Y-branch attenuator is located upstream with respect to the Mach-Zehnder modulator.

In an alternative embodiment, the Y-branch attenuator is located downstream with respect to the Mach-Zehnder modulator.

The integrated optical device may comprise a dummy waveguide coupled to the second arm of said Y-branch attenuator and a feedback circuit optically connected to said dummy waveguide, said feedback circuit comprising electrical control circuits for controlling the wavelength of said emitted signal.

DETAILED DESCRIPTION OF THE PREFERRED EMBODIMENTS

Figure 1:
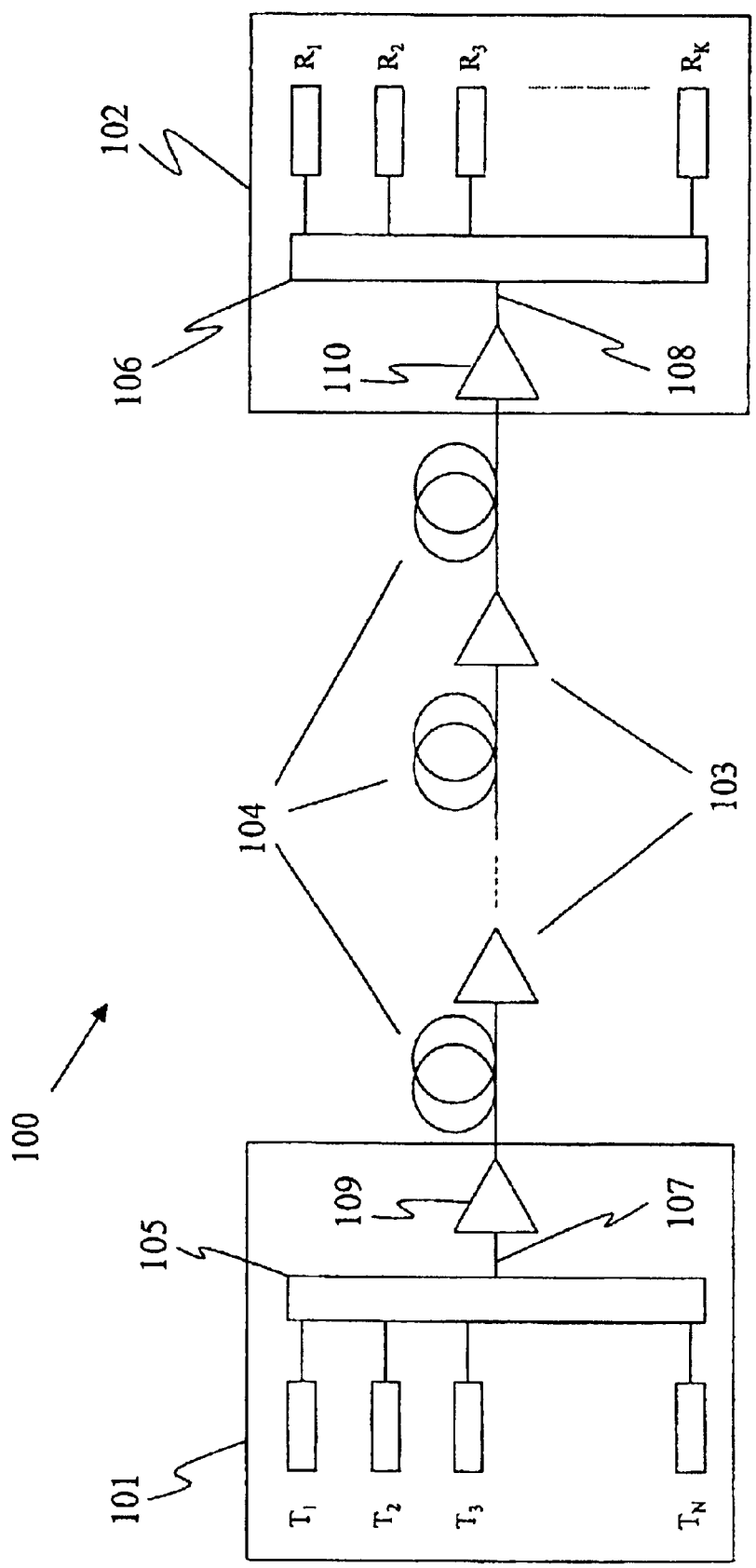
FIG. 1 schematically shows a WDM system using EDFAs.

FIG. 1 schematically shows a WDM system 100 comprising at least one transmitting station 101, at least one receiving station 102 and an optical transmission line comprising optical amplifying stations 103 separated by optical fibre spans 104.

Transmitting station 101 has N transmitter modules $T_1$, $T_2 \ldots T_N$ for transmitting N modulated signals of different wavelength $\lambda_1 \ldots \lambda_N$. The number N can be, e.g., 32, or 64, or 128. Herein and in the following of the description we will refer to a "modulated optical signal of wavelength λ" as a "channel". In a preferred embodiment, which will be described in more detail below with reference to FIG. 2, the transmitter modules $T_1$, $T_2 \ldots T_N$ are transponder modules, adapted to receive external origin optical signals fed to the transmitting station 101 (not shown in FIG. 1), detect and regenerate them with new parametric characteristics (such as wavelength, format, etc.) suitable for WDM system 100. These external origin optical signals may come, for example, from previous nodes in a complex network of which WDM system 100 is a part.

Transmitting station 101 also comprises a multiplexer 105, for combining together on a fibre 107 the channels exiting by the transmitting modules $T_1$, $T_2 \ldots T_N$. Multiplexer 105 can be realized in any manner convenient to the skilled in the art, for example by passive splitters, cascades of interferential filters, fused fibre couplers or arrayed waveguide gratings.

Fibre 107 is preferably a single-mode fibre. More preferably fibre 107 is a step-index fibre.

Transmitting station 101 may also comprise a transmitter optical amplifier 109 for raising the power level of the channels to an appropriate value, in order to enable them to travel over the first optical fibre span 104 keeping a sufficient power level at the end of the same first span 104, for ensuring good transmission quality. The transmitter optical amplifier 109 comprises at least one erbium doped fibre amplifier.

A plurality of optical amplifying stations 103 comprising erbium doped optical amplifiers is arranged along the transmission line. The number of amplifying stations, as well as exact disposition, composition, pumping schemes and number of erbium doped fibre amplifiers in each amplifying station 103, can be adapted by the skilled in the art to fulfil the specific needs that arise in each practical case.

Optical amplifying stations 103 are separated by optical fibre spans 104, which can be formed by step-index optical fibres, dispersion-shifted fibres, or even by concatenation of step-index and dispersion-shifted fibres. Dispersion-shifted fibres include, for example, Non-Zero Dispersion fibres and large effective area fibres. Typically, optical fibres forming spans 104 are single mode optical fibres.

Receiving station 102 comprises K receiver modules $R_1$, $R_2 \ldots R_K$ and a demultiplexer 106, which separates K channels of different wavelength $\lambda_1 \ldots \lambda_K$ coming from the optical transmission line through optical fibre 108, in order to send them to the receiver modules $R_1$, $R_2 \ldots R_K$.

Demultiplexer 105 can be realized in any manner convenient to the skilled in the art, for example by passive splitters, cascades of interferential filters, fused fibre couplers or arrayed waveguide gratings.

For compensating losses resulting from the last span of fibre and the demultiplexer 106, a receiver optical amplifier 110 is advantageously added in the receiving station 102. Receiver optical amplifier 110 comprises at least one erbium doped optical fibre amplifier.

WDM system 100 may also comprise along the transmission line add and drop stations, where single channels or groups of channels can be added and/or dropped, as well as dispersion equalizers, according to the specifications.

The number of received channels K may differ from the number of transmitted channels N if the number of channels added and dropped at intermediate sites differ from each other.

Because of non-uniform wavelength-dependant gain profile and saturation characteristics of erbium doped fibre amplifiers comprised in the amplifying stations 103 (as well as in transmitter and receiver optical amplifiers 109, 110), each channel in the WDM system 100 experiences a different optical gain along the transmission line. In an optical transmission system comprising one or more amplifying stations, a high differential of optical gain between the various WDM channels can lead to unacceptable bit-error-rate (BER) performance in some of the channels. For compensating this differential of optical gain, it is possible to introduce a predetermined difference of power level between the various channels at the transmitting station 101, by using electrically controllable attenuators included in the transmitter modules $T_1, T_2 \ldots T_N$. In practice, the power level of each transmitted channel is carefully adjusted by the electrically controllable attenuators, according to the wavelength of the channel, in such a manner that the channels which are subject to a greater optical gain are more attenuated (de-emphasized) at the transmitting station 101. Such a method is known as de-emphasis WDM. A fine adjustment of the power level of the various channels can be performed in order to optimize one or more parameters of the transmission system 100: for example, de-emphasis level of the channels may be adjusted in order to equalize the power level or the signal-to-noise ratio (SNR) or the BER of all the channels at the receiving station 102.

Figure 2:
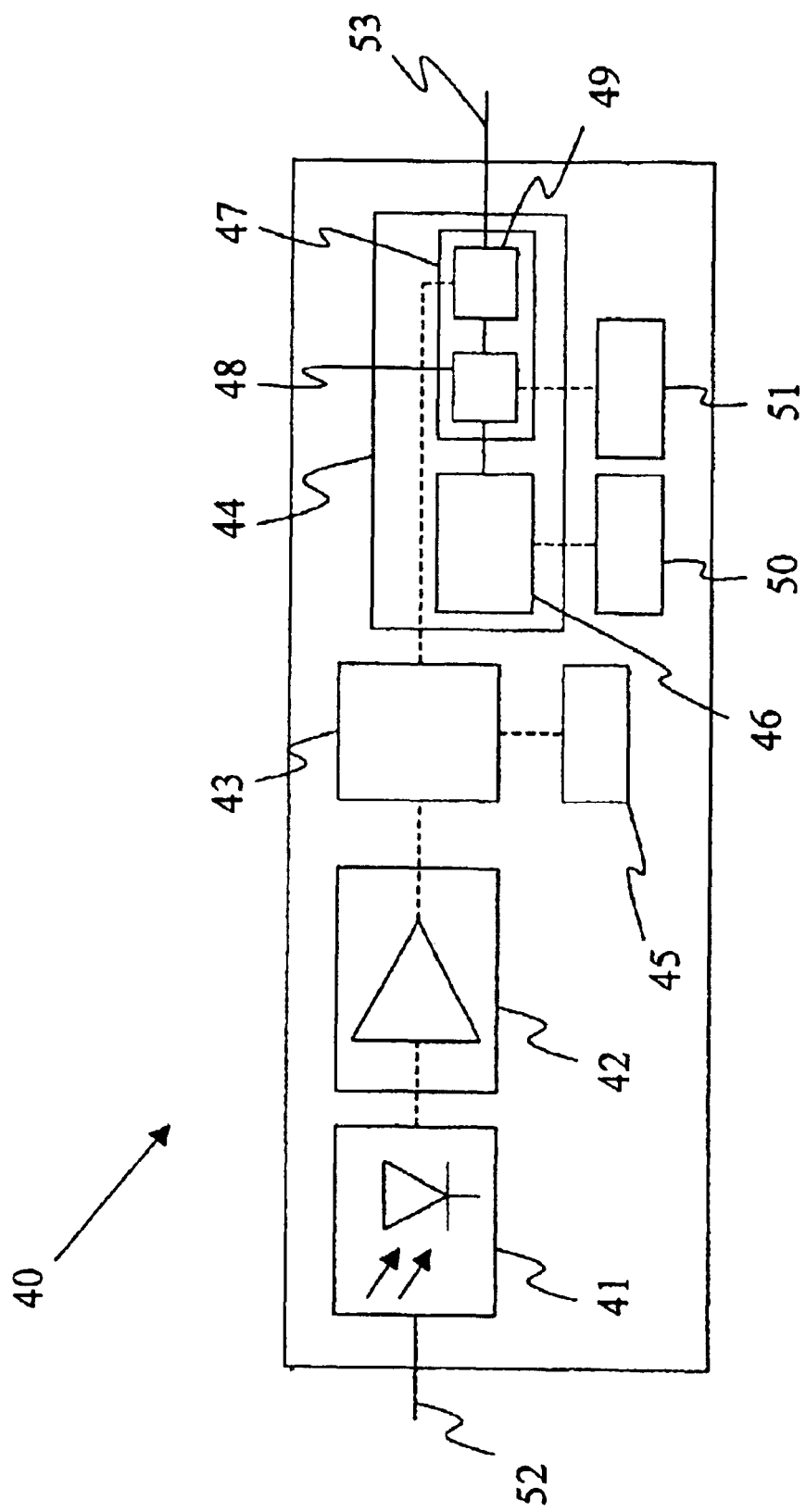
FIG. 2 schematically shows a transmitting module enclosing a modulator with integrated attenuator.

Referring to FIG. 2, a transponder module 40 particularly suitable to be used as transmitting module in a WDM system using de-emphasis is shown. For the sake of clarity, the optical paths are shown by solid lines, while the electrical paths are represented by dotted lines.

Transponder module 40 comprises a photodetector 41, an electronic amplifier 42 and a piloting circuit 43 of a modulated laser emitter generally identified by 44.

Conveniently, circuits generating of relaying supplementary control signals, generally identified by 45, are connected to the piloting circuit 43.

The modulated laser emitter 44 comprises a laser 46 and an external optical intensity modulator 47, typically connected by a polarization maintaining fibre.

The external optical intensity modulator 47 comprises a modulating portion 49 and an attenuating portion 48. The modulating portion 49 includes a modulator of the Mach-Zehnder type integrated on a planar substrate. The attenuating portion 48 includes an electrically controllable attenuator integrated on the same substrate of the Mach-Zehnder modulator. In FIG. 2 the attenuating portion 48 is upstream with respect to the modulating portion 49: in another embodiment the modulating portion 49 is upstream with respect to the attenuating portion 48. Herein and in the following of the description, "downstream" and "upstream" are to be referred to the propagation direction of an optical signal inserted in the intensity modulator 47. External optical intensity modulator 47 will be described in detail in the following of the description, with reference to FIGS. 7 to 20.

Transponder module 40 also comprises a wavelength controlling circuit 50 connected to the laser 46 and an attenuator control circuit 51' connected to the attenuating portion 48.

Input optical fibre 52 and output optical fibre 53 are also fixed to the module 40. Operation of transponder module 40 is the following. An external origin optical signal of given transmission features (wavelength, protocol, bit-rate . . . ) is received, through input optical fibre 52, by photodetector 41, which converts the optical signal in an electric signal. The electric signal is fed to the electronic amplifier 42 and then to the piloting circuit 43.

Laser 46 emits a continuous wave (CW) polarized (usually TE) optical signal having a wavelength of a pre-selected value, according to the specific needs of WDM system 100 (see. FIG. 1), accurately controlled by circuit 50. The optical signal emitted by the laser 46 is fed to the external optical modulator 47.

Piloting circuit 43 gives pre-selected optimized modulation features to the electric signal coming from the electronic amplifier 42. The modulation features are adapted to be transferred to the optical signal exiting from laser 46 according to the specific needs of the WDM transmission system 100 (see FIG. 1). For example, electronic 3R (retiming, reshaping and regeneration) optimized for a given modulation bit-rate may be performed on the electric signal. By means of the admitting circuits 45, supplementary control signals may be also added. For example, a FEC (Forward Error Correction) signal may be interleaved with the regenerated signal. As another example, a service channel may be added.

Transfer of the new modulation features to the optical signal exiting from laser 46 is realized by means of the external optical modulator 47. To this end, the electric signal exiting from piloting circuit 43 and carrying modulation information in a frequency range from hundreds of MHz to tens of GHz, is fed to the modulating portion 49 of the external optical modulator 47.

The attenuating portion 48 of the external optical modulator 47 provides accurate and pre-selected power level of the optical signal, which is regulated according to the specific de-emphasis level associated with the wavelength of the optical signal itself, as previously described. To this end, the control unit 51 sends an electrical control signal to the attenuating portion 48. Hereinafter, we will generally refer to the attenuating portion 48 as an "attenuator" 48 and to the modulating portion 49 as a "modulator" 49.

The channel with adjusted power level exiting from the external modulator 47 is then sent towards the multiplexer 105 (see FIG. 1) through output optical fibre 53.

The attenuator 48 integrated on the same substrate of the modulator 49 allows a very compact and low-lossy device 47 for adjusting the power-per-channel to be obtained. Though, Applicant has found that the integration of the two blocks 48, 49 has to be performed very carefully, since the characteristics of the modulator 49 could be adversely affected by the simple presence of the waveguide structures constituting the attenuator 48, or vice versa: that is, a crosstalk between the two devices may be generated by the integration. In the following of the description, embodiments and examples of the optical modulator with integrated attenuator 47 will be described in detail, showing how the crosstalk problems can be overcome.

The two building blocks of the modulator with integrated attenuator 47 are a Mach-Zehnder intensity modulator for the modulating portion 49 and a Y-branch attenuator for the attenuating portion 48. A brief description of the two building blocks will be first done with reference to FIGS. 3 to 6.

Figure 3:
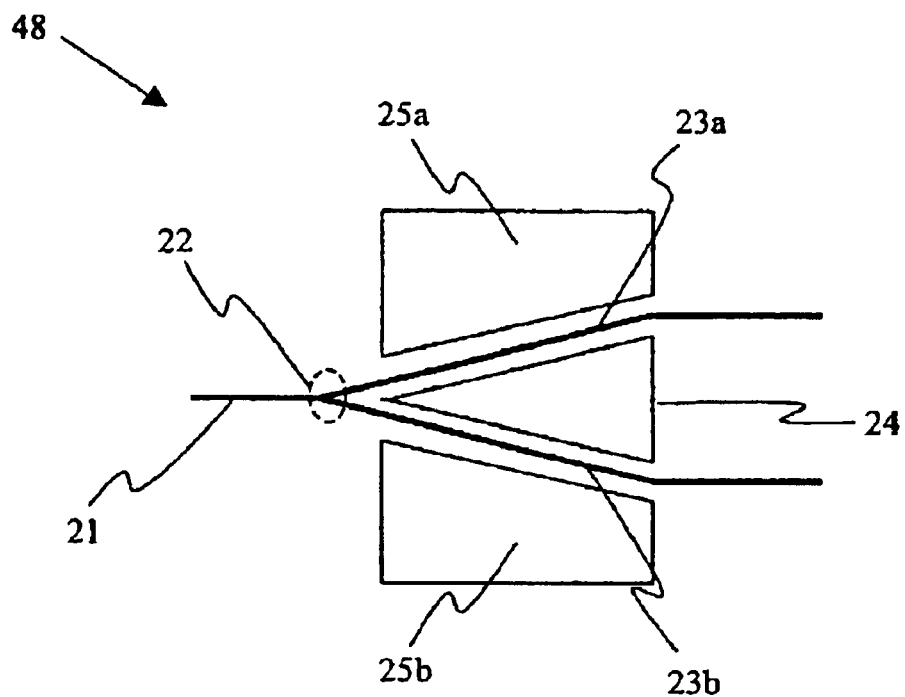
FIG. 3 schematically shows a Y-branch attenuator.

FIG. 3 schematically shows the attenuator 48, that comprises a Y-branch including a common single-mode waveguide 21 and two single-mode waveguide arms 23a, 23b forming an acute angle between them, each departing from a junction 22, which forms a multimodal region schematically highlighted by dotted lines in FIG. 3. Waveguides 21, 23a, 23b are integrated on a planar electro-optical substrate, for example an x-cut, y-propagating $LiNbO_3$ substrate. A central, substantially triangular-shaped electrode 24 and lateral electrodes 25a, 25b are deposited on the substrate near the waveguides, with a shape fitted to the waveguide shape, in order to maintain a desired electrodeto-electrode gap. The exact shape and disposition of the electrodes on the substrate may be accomplished by the skilled in the art according to the specific requirements to be fulfilled.

An electrical signal having low frequency, typically DC, is applied to the central electrode 24 by means of a suitable generator and driver. In the transmitter module 40 of FIG. 2, generator and driver supplying DC voltage correspond to the circuit schematically indicated as 51.

Lateral electrodes 25a, 25b are connected to a reference voltage, typically the ground voltage.

An input optical signal is launched into the input waveguide 21 (from the left to the right in FIG. 3). In the transmitter module 40 of FIG. 2 the input optical signal is supplied by laser 46.

When no voltage is applied to the central electrode 24, the power of the optical signal is equally splitted between the two waveguide arms 23a, 23b. By applying a voltage $V_{att} \neq 0$ to the central electrode 24, the index of refraction in the vicinity of the multimodal region 22 is changed and the ratio of the power of the optical signal exiting from waveguide arms 23a, 23b can be modified and accurately tuned. In this case, we will refer to the "optical signal exiting from the attenuator 48" as the portion of optical signal exiting from one of the waveguide arms 23a 23b, for example arm 23a.

The Y-branch forming the attenuator 48 can also be used in a reversed manner, by launching the input optical signal into one of the waveguide arms, for example arm 23a (from the right to the left in FIG. 3). When no voltage is applied to the central electrode 24, the power of the optical signal is equally splitted in the multimodal region 22 on the fundamental mode of propagation, which is guided by single-mode waveguide 21, and on the first higher order mode of propagation, which is radiated on the substrate in a continuous spectrum of modes: A 3 dB loss of "guided power" is thus generated by the multimodal region 22. By applying a voltage $V_{att} \neq 0$ to the central electrode 24, the power of the optical signal propagating in the waveguide 21 can be modified and accurately tuned. In this case we will refer to the "optical signal exiting from the attenuator 48" as the optical signal exiting from common waveguide 21.

Figure 4:
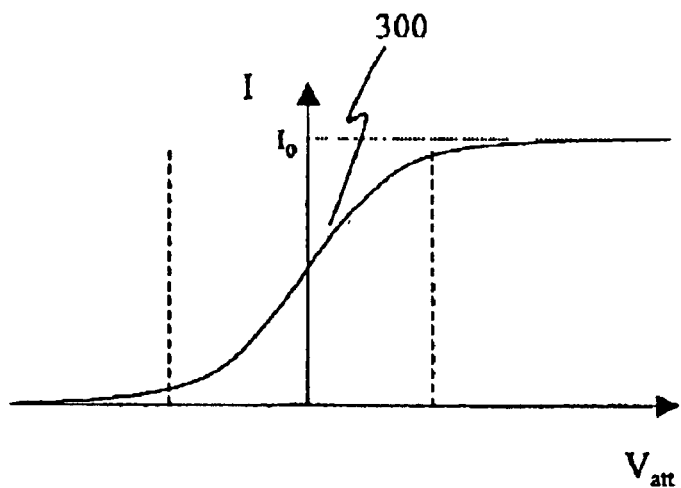
FIG. 4 schematically shows the characteristic curve of a Y-branch attenuator.

FIG. 4 schematically shows the characteristic curve of the power I of the optical signal exiting from the attenuator 48 vs. the voltage $V_{att}$ applied, for both the cases a) Y-branch used with input optical signal launched into input common waveguide 21: in this case I is the power of the optical signal exiting from one of the waveguide arms, for example arm 23a;

b) Y-branch used with input optical signal launched into one of the waveguide arms, for example arm 23a: in this case I is the power of the optical signal exiting from common waveguide 21.

As seen in FIG. 4, the power intensity I of the optical signal exiting from the attenuator 48 monotonically ranges from 0 to $I_0$, being $I_0$ the intensity of the optical signal entering in the attenuator 48. These two extreme values correspond to high voltage values (typically about ±30 V), sufficient to completely switch the optical signal in one or in the other of the two waveguide arms, as in the case a) above identified, or to completely couple the power of the optical signal on the fundamental or on the first higher order mode of propagation, as in the case b) above identified.

In an intermediate region 300 of the curve, schematically highlighted by dotted lines in FIG. 4, the power of the optical signal exiting by the attenuator 48 can be tuned according to the required level, by properly setting the applied voltage $V_{att}$. In order to express the attenuation range, for any value of applied voltage $V_{att}$, we define the "attenuation level" (AL, expressed in dB) as the variation of the power of the optical signal exiting from the attenuator 48 with respect to the power of the optical signal exiting from the attenuator 48 when $V_{att}=0$.

AL may be negative (lower intensity exiting from the attenuator with respect to the intensity when $V_{att}=0$) or positive (higher intensity exiting from the attenuator with respect to the intensity when $V_{att}=0$).

Typical AL values to be achieved in a telecommunication system as the system indicated with 100 in FIG. 1 are in a range comprised between −10 dB and +5 dB. Such values are achievable using a Y-branch attenuator integrated on a lithium niobate substrate by applying a driving voltage $V_{aH}$ ranging until about ±30 V.

Adoption of such high driving voltage values for a device to be integrated on the same substrate of a Mach-Zehnder modulator goes directly against the current trend of reducing the driving voltage of electro-optical devices. On the other hand, the characteristic curve of the Y-branch attenuator (FIG. 4) is a monotone function, and then a simple electronic control circuit 51 (see FIG. 2) can be used. Another important advantage of the Y-branch attenuator is that it is relatively stable with respect to fabrication process variations.

Figure 5:
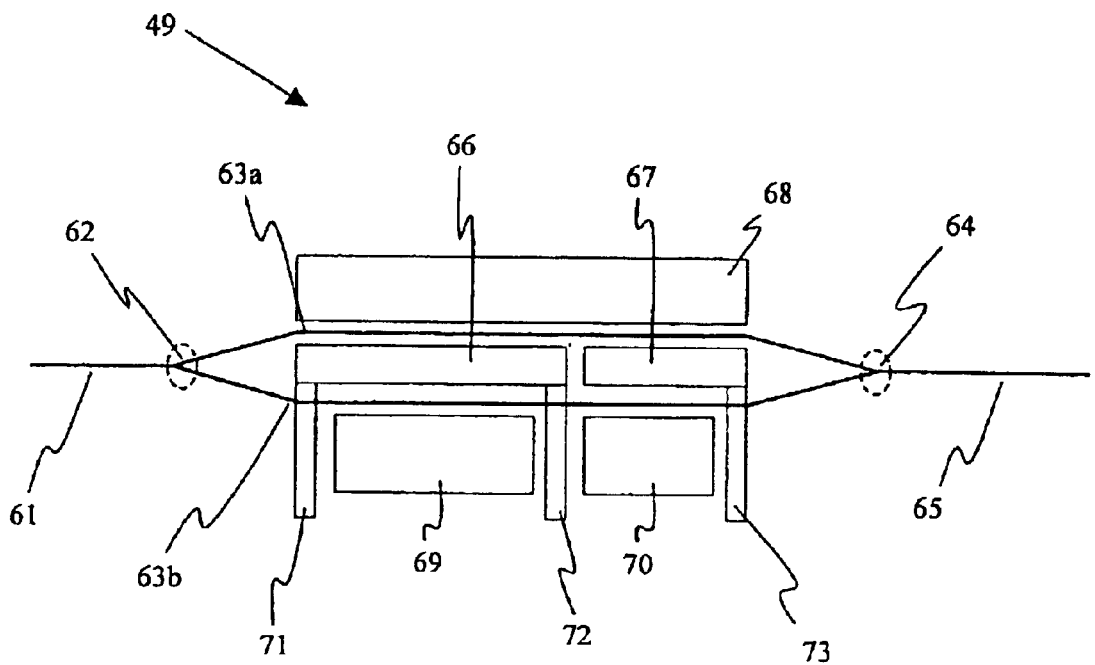
FIG. 5 schematically shows a Mach-Zehnder modulator.

FIG. 5 schematically shows a Mach-Zehnder interferometric structure for an intensity modulator 49 comprising a single mode input waveguide 61, two waveguide arms 63a, 63b of equal length and a single mode output waveguide 65. The two waveguide arms 63a, 63b depart from a first junction 62, defining a first multimodal region, and converge in a second junction 64, defining a second multimodal region 64. Both multimodal regions of the Mach-Zehnder interferometric structure are schematically highlighted by dotted lines in FIG. 5. Waveguides 61, 63a, 63b, 65 are integrated on the same planar electro-optical substrate of the attenuator 48 (see FIG. 3).

A RF electrode 66 is deposited between the waveguide arms 63a, 63b. Electrodes 68, 69 are deposited outside the interferometric structure, laterally with respect to waveguide arms 63a, 63b, and connected to a reference voltage as ground. Strips 71, 72 are connected to RF electrode 66, at the ends thereof, thereby defining respectively an input RF port and an output RF port of the modulator 49.

Conveniently, a bias electrode 67 is also deposited between the waveguide arms 63a, 63b. A respective further ground electrode 70 may be then deposited laterally with respect to waveguide arms 63a, 63b. A suitable strip 73 is connected to the bias electrode, at one end thereof, defining an input bias port. The exact shape and disposition of the electrodes on the substrate may be accomplished by the skilled in the art according to the specific requirements to be fulfilled.

An electrical RF signal is applied to the input RF port 71 of the modulator 49 and then guided to the RF electrode 66. In the transmitter module 40 of FIG. 2 the electrical RF signal is supplied by the piloting circuit 43. Typically, a matching impedance circuit is connected to the output RF port 72 as a closure of the RF circuit, in order to minimize RF power reflections.

An electrical low frequency signal, typically a DC signal, supplied by suitable generator and driver (not shown), is applied to the input bias port 73. Bias circuit is typically laid open.

In another embodiment, a unique electrode is deposited between the waveguide arms 63a, 63b: in this case, the voltage driving apparatus is accomplished such that the unique electrode works both as RF electrode and as bias electrode.

An optical signal is applied to input waveguide 61, equally splitted in waveguide arms 63a, 63b by the first junction 62, then recombined in output waveguide 65 by the second junction 64. In the transmitter module 40 of FIG. 2 the optical signal is supplied by laser 46.

Application of the RF signal to electrode 66 modifies the index of refraction along waveguide arms 63a, 63b. According to that, the optical path followed by the optical signal in the two waveguide arms 63a, 63b can be modified so as optical signals travelling in waveguide arms 63a, 63b may have a reciprocal phase delay. Interference between the two signals is generated in recombining junction 64. In particular, when the reciprocal phase delay equals 2nπ (where n is an integer) a maximum of interference is reached and all the power of the optical signal is guided by single mode output waveguide 65; when the reciprocal phase delay equals π+2nπ a minimum of interference is reached and substantially all the power of the optical signal is radiated on the substrate, due to the coupling of the optical power on the first higher order mode of propagation, which is not guided by single mode output waveguide 65, and radiated on the substrate in a continuous spectrum of modes.

Figure 6:
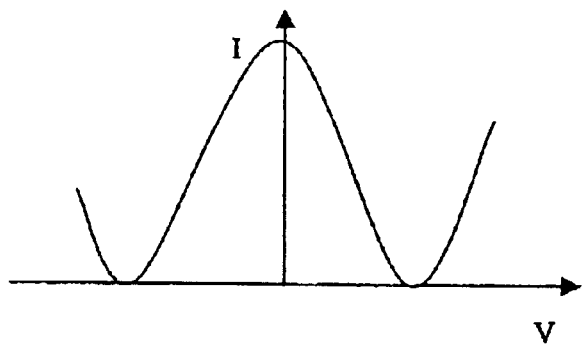
FIG. 6 schematically shows the characteristic curve of a Mach-Zehnder modulator.

FIG. 6 schematically shows the characteristic curve of the power I of the optical signal exiting from output waveguide 65 vs. RF voltage applied $V_{mod}$, having alternated maxima and minima. A fundamental parameter of a modulator which has to be accurately controlled in a telecommunication system is its extinction ratio (ER, expressed in dB), defined as the ratio between the power values of maxima and minima of the characteristic curve. Typical ER values to be achieved for an intensity modulator in a WDM system as the system indicated with 100 in FIG. 1 are 18–20 dB. Typical voltage values corresponding to an excursion between a minimum and a maximum of transmission (measured at DC) are of about 2.5–4 V.

Various embodiments and examples of the modulator with integrated attenuator 47 will be now presented.

In all the examples, implemented for a wavelength of the optical signal in a range around 1550 nm and a modulation bit-rate of 2.5 Gbit/s, waveguides were integrated on an x-cut, y-propagating LiNbO$_3$ substrate having the following dimensions: length 60 mm, width 2 mm, thickness 1 mm. Integration of the waveguides was performed by diffusion of a titanium stripe of about 1000 angstrom carried out for a time of 10 hours at a temperature of 990° C. All the electrodes were Au electrodes.

Figure 7:
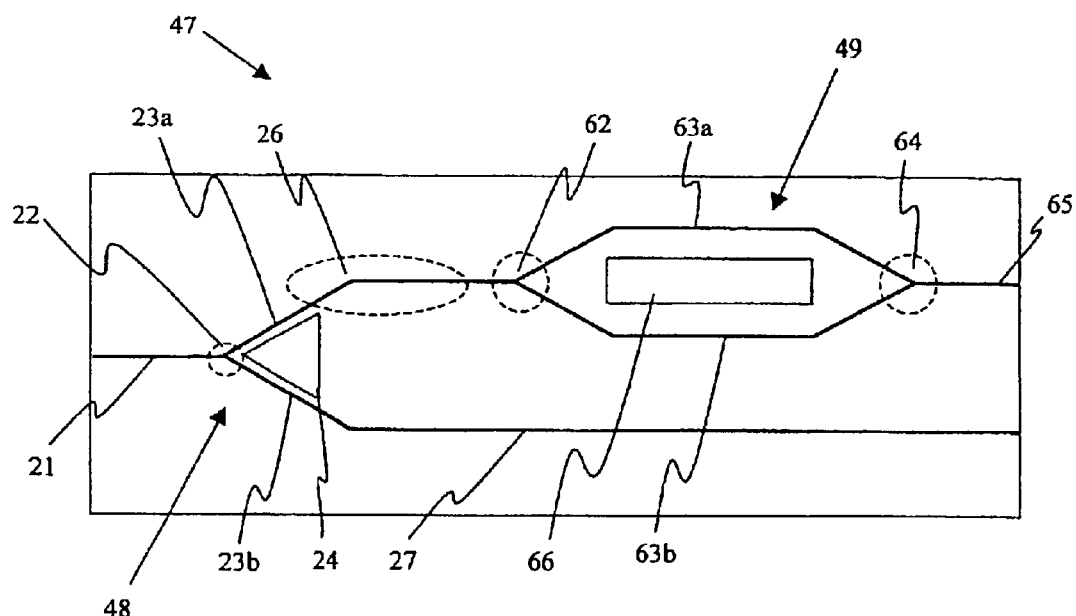
FIG. 7 schematically shows a first embodiment of a modulator with integrated attenuator with a Mach-Zehnder modulator downstream with respect to a Y-branch attenuator.

First Embodiment: with reference to FIG. 7, a first embodiment of the modulator with integrated attenuator 47 is schematically shown, comprising a Mach-Zehnder modulator 49 downstream with respect to a Y-branch attenuator 48. A unique electrode is drawn in the modulator 49 for both bias and RF. For the sake of clarity, ground electrodes and connecting strips are not drawn, but it has to be intended that each of the two integrated components has its complete set of electrodes, according to what stated above with reference to FIGS. 3 and 5. Same numeral references used in FIGS. 3 and 5 are adopted whereas possible for similar parts. Device 47 also comprises a single-mode waveguide 26 connecting the first waveguide arm 23a of the Y-branch attenuator 48 with the input of the Mach-Zehnder modulator 49. The connecting waveguide 26 is schematically shown as having a sharp bend, while actually it is formed by a progressively curved waveguide, as the skilled in the art can readily appreciate. Preferably, device 47 also comprises a supplementary waveguide 27 departing from the second waveguide arm 23b of the Y-branch attenuator 48 and reaching the substrate end. Typically, a polarization maintaining optical fibre (not shown) is aligned and connected to the input waveguide 21 and a single-mode optical fibre (not shown) is aligned and connected to the output waveguide 65.

An optical signal is inserted in the input waveguide 21 of the attenuator 48. A first portion of the optical signal is diverted in waveguide branch 23a: the power of said first portion of the optical signal is regulated by means of a DC signal applied to the central electrode 24, according to a predetermined level. The remaining portion of the optical signal is diverted in waveguide branch 23b and then preferably guided away by supplementary waveguide 27.

The connecting waveguide 26 guides the first portion of the optical signal towards the Mach-Zehnder modulator 49. Here, the optical signal is modulated by means of a proper electrical RF voltage signal applied to RF electrode 66. Finally, the first portion of the optical signal exits from the device 47 through the output waveguide 65 thereof.

EXAMPLE 1

In a first exemplary device made by the Applicant according to the first embodiment, the length of the Mach-Zehnder interferometer forming the modulator 49 was about 40 mm (junction 62 to junction 64 distance). The width of the waveguides forming the interferometric structure was optimized to 6 μm, in order to control losses of the device, corresponding to a Mode Field Diameter (MFD) of about 9 μm at 1550 nm. The center-to-center distance between the waveguide arms 63a, 63b of the interferometric structure was 30 μm. A unique electrode was deposited directly on the lithium niobate substrate for both RF and bias, having a length of 24 mm, a thickness of 5 μm and a width of 15 μm; the gap between the RF/bias electrode and ground electrodes was 15 μm.

With regards to the Y-branch attenuator 48, waveguide arms 23a, 23b were deposited respectively at an angle of −0.1° and +0.1°, as measured clockwise with respect to a longitudinal direction. By "longitudinal direction" it is intended, herein and in the following, a direction parallel to the main propagation axis in the crystal (the y axis in this example). The width of the waveguides was 6 μm. A layer (0.5 μm) of SiO$_2$ was deposited over the substrate after deposition of the waveguides and before deposition of the electrodes. The electrodes had a thickness of 0.1 μm. The length of the central electrode was about 10 mm and its shape was fitted to the waveguide shape in order to maintain a gap between central electrode and ground electrodes around 100% of the MFD (about 9 μm).

Figure 8:
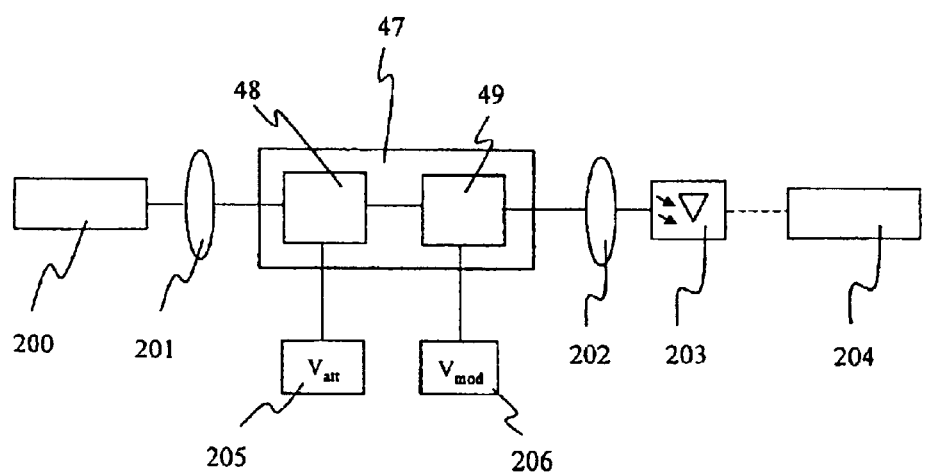
FIG. 8 schematically shows an experimental setup used for measuring the extinction ratio and the attenuation range of a modulator with integrated attenuator.
Figure 9:
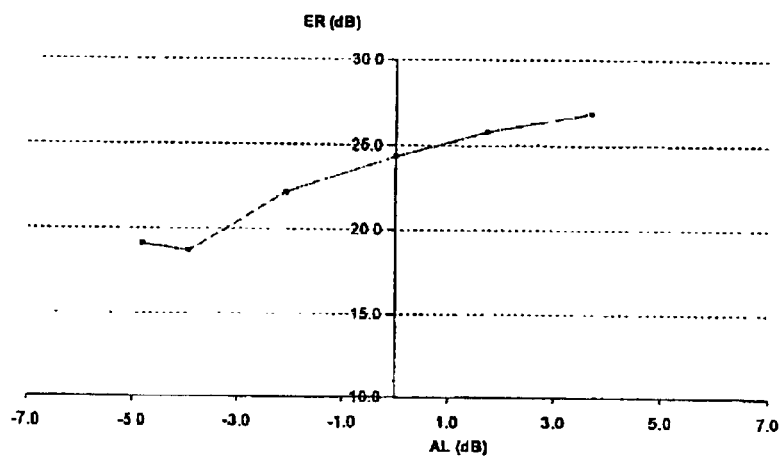
FIG. 9 shows a plot of the extinction ratio vs. the attenuation range of a first example of a modulator with integrated attenuator realized according to the first embodiment.

FIG. 9 shows a plot of the measured extinction ratio ER of the above described exemplary device vs. the attenuation level AL, as measured in a test carried out using the experimental setup schematically shown in FIG. 8.

Referring to FIG. 8, a DFB laser 200 emitting light of a wavelength of 1550 nm and output power of 0 dBm was used as source of an optical signal, a first lens 201 was used for focusing the light to the device 47, a second lens 202 was used for focusing the light exiting from the device 47 to a photodiode 203, which transformed the optical signal in an electrical signal, then fed to a power meter 204. The modulator with integrated attenuator 47 was piloted by means of two generators 205, 206 of DC electrical signal. Attenuation level AL=0 of the attenuator 48 was measured by fixing to zero the voltage value $V_{att}$ of the generator 205 and measuring the power of the maximum of transmissivity of the device 47 with respect to the voltage $V_{mod}$ applied to the modulator 48 by means of generator 206. Extinction ratio ER of the device for AL=0 was then measured, by adjusting $V_{mod}$ in order to find the minimum of transmissivity and measuring the corresponding power. The same two-step procedure was repeated for different values of $V_{att}$, corresponding to respective values of AL, in order to obtain the graph shown in FIG. 9.

As it can be seen in FIG. 9, ER is always greater that 18 dB in all the interval of interest, but it is not constant for different values of AL. In particular, when AL becomes negative the ER of the device progressively decreases until reaching values closer to the minimum accepted specifications of a WDM system. Moreover, if optical fibres are pigtailed to the device, ER may still decrease due to unavoidable losses introduced by the pigtailing process, possibly reaching unacceptable values.

Applicant has found that this behaviour of the ER depends on a crosstalk between the two integrated devices on a single substrate.

In particular, Applicant has understood that a problem related to the first embodiment is linked with a sort of non-ideality introduced by the curved sections of the waveguides forming the Y-branch attenuator 48 and the curved section of the connecting waveguide 26 (see FIG. 7) put between the Y-branch 48 and the Mach-Zehnder interferometric structure 49.

When the optical signal on the fundamental mode of propagation travels in a curved section of a waveguide, small percentages of optical power are coupled on higher order modes of propagation. If the curved waveguide is single-mode, this portion of optical power is not guided and spread on the substrate in a continuous spectrum of radiated modes. A portion of optical power associated with the radiated modes may still re-couple in the subsequent sections of the curved waveguide, though progressively attenuated. In particular, the more the cut-off wavelength of the waveguide for the first higher order mode (which depends on the geometrical dimensions of the waveguide) is far from the wavelength of the optical signal, the higher is the attenuation. In practice, the spreading of the radiation associated with the radiated modes takes place within a "spreading angle" having its apex lying substantially on the waveguide: the more the cut-off wavelength of the waveguide is far from the wavelength of the optical signal, the more the "spreading angle" is open, which corresponds to a "quick" spreading of the radiation away from the waveguide.

With reference to the optical signal exiting from the waveguide arm 23a and travelling in the curved connecting waveguide 26, Applicant has understood that a portion of optical power coupled to radiated modes may be in a small part re-guided by the connecting waveguide 26 itself towards the interferometric structure forming the modulator 49, in a great part spread on the substrate according to a predetermined angle, both phenomena being dependent from the cut-off wavelength value of the connecting waveguide 26.

Arriving to the multimodal region 62 at the input of the interferometric structure 49, a portion of the optical power associated with the continuous spectrum of the radiated modes, traveling on the substrate, may re-couple on higher order modes, in particular to anti-symmetric higher order modes. Furthermore, a small fraction of optical power coupled to radiated modes re-guided by the connecting waveguide 26, though strongly attenuated, may reach the first multimodal region 62 of the interferometric structure 49 along the connecting waveguide 26.

This can lead to an unbalanced splitting of the optical signal in the waveguide arms 63a, 63b of the interferometric structure, that is to an incorrect functioning of the device 47. In this respect, it has to be noticed that a fraction of 1% of power on the first higher order mode of propagation in an optical signal entering in a Mach-Zehnder modulator may cause an upper limit in the ER of 20 dB, due to the high sensitivity of the multimodal region formed by first junction 62 to the presence in the guided radiation of higher order modes of propagation.

The radiation entering in the interferometric waveguide structure forming the modulator 49, in fact, should as much as possible have a symmetric field profile, and the fundamental mode of propagation satisfies such a requirement: if optical power is coupled to higher order modes, in particular to anti-symmetric higher order modes (as the first higher order mode) in the input multimodal region, the splitting of the optical signal in the waveguide arms can be uneven, with worse results on the ER of the device.

On the other hand, a fraction of radiation spreading on the substrate starting from the curved waveguide 26 in a region comprised between the Y-branch attenuator 48 and the Mach-Zehnder modulator 49 may couple in the waveguide arms 63a, 63b of the subsequent interferometric structure of the modulator 49, possibly contributing to the unbalancing of the optical signal travelling in the two waveguide arms 63a, 63b of the modulator 49.

Similar considerations may apply for curved sections of the waveguides forming the Y-branch attenuator 48.

In principle, the problem can be solved by keeping sufficiently far the interferometric structure forming the modulator 49 (in particular the multimodal region 62) from the Y-branch attenuator structure 48, that is by using a longer chip substrate. This solution is not advantageous in a WDM or in particular in a DWDM system, where space-consuming devices should be avoided in view of the large number of channels involved.

Figure 12:
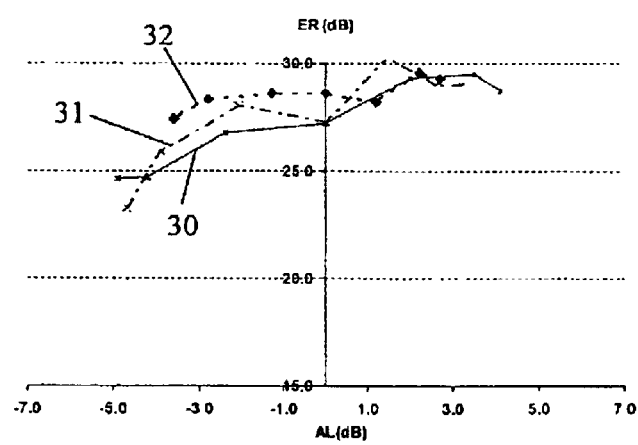
FIG. 12 shows a plot of the extinction ratio vs. the attenuation range of three examples of modulator with integrated attenuator realized according to the first embodiment.

Applicant has found three solutions to the problem not involving the use of a longer chip. These three solutions were implemented on exemplary devices and are explained in the following. FIG. 12 resumes the results of the same experiment described with reference to FIG. 8 for the exemplary devices including the three presented solutions.

EXAMPLE 2

In the first solution, the width of the waveguides forming the Y-branch attenuator 48 and the connecting waveguide 26 was reduced to 5.7 $\mu$m, whereas the width of the waveguides forming the modulator 49 was kept to 6 $\mu$m in order to maintain propagation losses within the specifications. In such manner the cut-off wavelength value for the first higher order mode of propagation of the waveguides forming the Y-branch attenuator 48 and the connecting waveguide 26 was decreased, in order to keep it far enough from the wavelength of the optical signal. In this way, the attenuation of the optical power propagating on radiated modes in the waveguides 23a and 26 towards the optical modulator 49 was substantially enhanced. Correspondingly, the spreading angle of the radiation propagating on the substrate in the region comprised between the Y-branch attenuator 48 and the Mach-Zehnder modulator 49 was increased. A slight enhancement of propagation losses due to the lower guiding of the mode propagating in the Y-branch 48 and in the connecting waveguide 26 was observed, but the maximum loss requirement was nevertheless met.

Curve 30 in FIG. 12 shows the result of the experiment for the device including the first solution. As can be seen, a very good result is obtained, being ER always much higher than 20 dB, with minimum values only slightly lower than 25 dB. The obtained result confirms that the optical power associated with radiated modes re-guided in the connecting waveguide 26 was effectively attenuated, as well as the optical power associated with radiated modes spreading on the substrate in the region between the Y-branch attenuator 48 and the Mach-Zehnder modulator 49 was quickly driven away, thus reducing the crosstalk between the two integrated devices 48, 49.

Depending from the required performances, the reduced width may be employed for the whole attenuator structure 48 or just for the connecting waveguide 26. Preferably, the width of the waveguides is reduced by an amount comprised between 5% and 16%, more preferably by an amount of about 8%.

EXAMPLE 3

Figure 10:
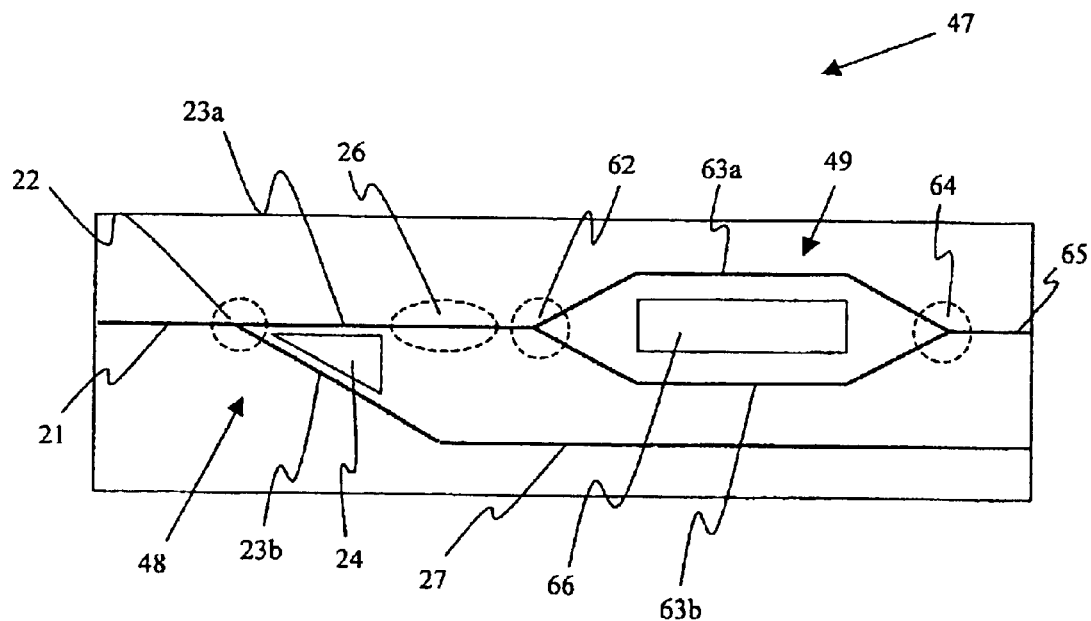
FIG. 10 schematically shows an example of modulator with integrated attenuator according to the first embodiment using a tilted Y-branch attenuator.

In the second solution, schematically shown in FIG. 10, a "tilted" Y-branch was used as attenuator 48. In practice, the same angle of 0.2° was maintained between branches 23a, 23b, but the branch 23a, that is the branch guiding light towards the modulator 49, was oriented parallel with respect to a longitudinal direction.

In such manner, triggering of radiated modes due to curved sections was substantially eliminated in the path followed by the portion of the optical signal of interest, that is the portion of optical signal entering in the modulator 49.

Curve 31 of FIG. 12 shows the result of the experiment for the device including the second solution. As it can be seen, a slightly more enhanced dependance of the ER on the AL remains, but the reached values are always well over 20 dB, thus completely meeting the specifications.

A further advantage of this configuration is that a very compact device can be obtained, since the connecting waveguide 26 is in practice a straight waveguide piece, thus eliminating need of chip space-consuming gradual design of curved sections.

EXAMPLE 4

Figure 11:
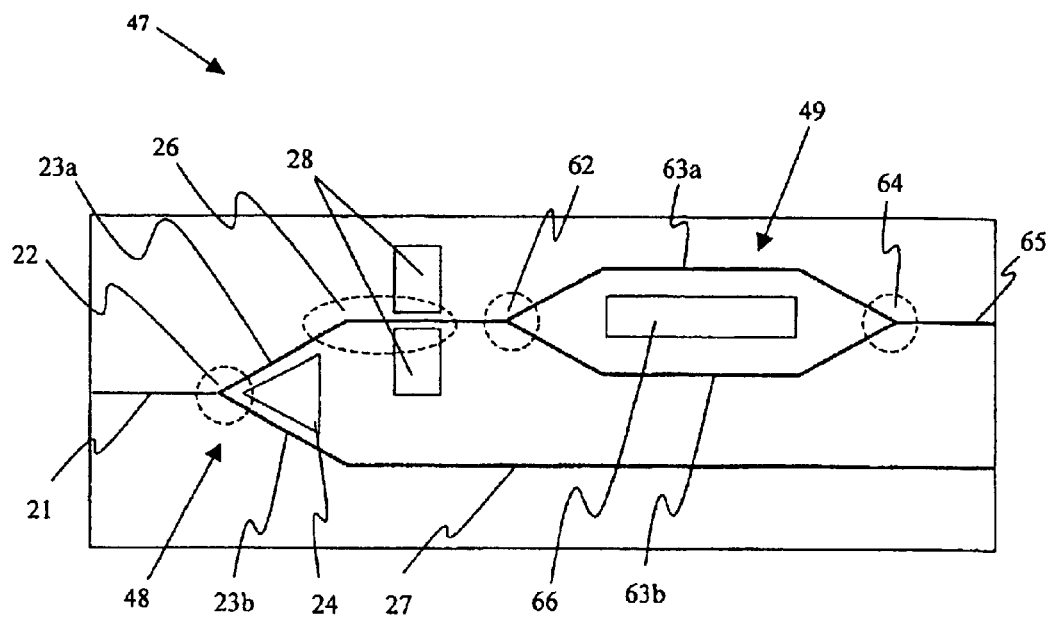
FIG. 11 schematically shows an example of modulator with integrated attenuator according to the first embodiment using filtering metal strips.
Figure 13:
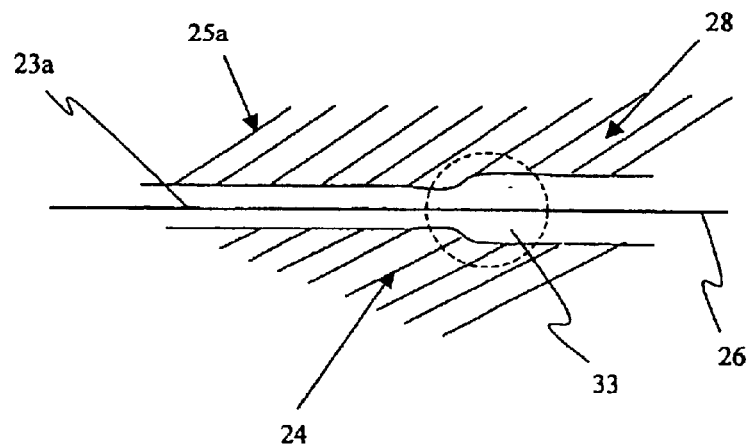
FIG. 13 schematically shows an enlarged view of the electrode region of the Y-branch attenuator, with an extension of the electrodes enclosing filtering metal strips.

In the third solution, schematically shown in FIG. 11, a filtering of the radiation spreading on the substrate in the region between the Y-branch attenuator 48 and the Mach-Zehnder modulator 49, starting from curved connecting waveguide 26, is effected. The filtering was accomplished by deposition of suitable material on the substrate, for example by deposition of metal strips 28 on both sides of the connecting waveguide 26, after removing of the buffer layer of $SiO_2$, at a proper distance from the waveguide itself. In an preferred embodiment realized by the Applicant, two metal strips having length of 4 mm were deposited on the substrate near the connecting waveguide 26, on both sides thereof, so as to leave a gap between them approximately equal to 170% of the MFD of the waveguide (about 16 $\mu$m). Advantageously, as shown in FIG. 13 the filtering metal strips were integrated in an extension of the central electrodes 24 and one of the ground electrodes 25a, by a proper shaping of the electrodes, progressively enlarging from about 100% of the MFD until about 170% of the MFD of the connecting waveguide 26 in a first portion 33 of the extension, and then maintaining a gap of 170% of the MFD of the connecting waveguide 26 in a second portion of the extension.

Curve 32 of FIG. 12 shows the result of the experiment for this embodiment including the third solution. As it can be seen, a very good result was obtained, with very reduced fluctuations of ER with respect to AL and ER values well over 25 dB in all the AL range of interest.

The improvements achieved in each of the examples 2 to 4 confirm that the radiation propagating on radiated modes on the substrate in the region between the two integrated devices 48, 49 can raise serious problems to the integration of the two devices 48, 49.

The three solutions described in examples 2 to 4 can be used alone or in combination with each other, as explained in the following preferred embodiment.

EXAMPLE 5

A series of thirty-four devices according to the first embodiment including all the three solutions of examples 2 to 4 was prepared in order to test robustness with respect to variations in technological parameters involved in manufacturing (as thickness of the Au electrodes, thickness of the waveguide-forming titanium stripe, diffusion time and temperature etc.). The geometrical and structural parameters of the devices were:

Mach-Zehnder waveguide width: 6 $\mu$m

Y-branch waveguide width: 5.7 $\mu$m

Angle of Y branches 23a, 23b (clockwise with respect to longitudinal direction): 0°/+0.20°

Length of filtering region: 4 mm

Gap around waveguides of filtering region: 16 $\mu$m

Gap between central and ground electrodes in Y-branch: 9 $\mu$m

The filtering region 28 was implemented by properly shaping the central electrode 24 and the ground electrode 25a adjacent to the straight branch 23a of the attenuator, in a similar manner with respect to what already explained in example 4 and schematically shown in FIG. 13.

Over a range of 10.8 dB of AL, reached with an applied voltage of ±26 V, the mean value of the maximum reached ER was 27.21 dB, with a standard deviation of 1.74 dB, whereas the mean value of the minimum reached ER was 21.67 dB, with a standard deviation of 2.83 dB. The mean value of the MFD was 9.25 $\mu$m and the mean value of the insertion loss of the integrated device was 4.53 dB.

The specifications to be met for use in a WDM system using de-emphasis were: minimum insertion loss lower than 5 dB; attenuation range for applied voltage comprised between −26V and +26V greater than 6 dB; minimum value of ER over the whole attenuation range greater than 18 dB.

As it can be seen by comparing the required and the obtained results, the test was completely satisfactory.

A further advantage of the first embodiment is the possibility of using the second portion of the optical signal coupled in waveguide arm 23b of the Y-branch attenuator 48, connected with the "dummy" waveguide 27, as an output to perform a feedback control in the transponder module 40 (see FIG. 2).

For example, the second portion of the optical signal can be used in the transmitter module of FIG. 2 for a feedback control of the emission wavelength of the laser 46. As a matter of fact, in DWDM systems there are quite stringent requirements on the wavelength of the various channels: in particular, the emission wavelength of the lasers has to be fixed with a precision of $10^{-2}$.

Figure 21:
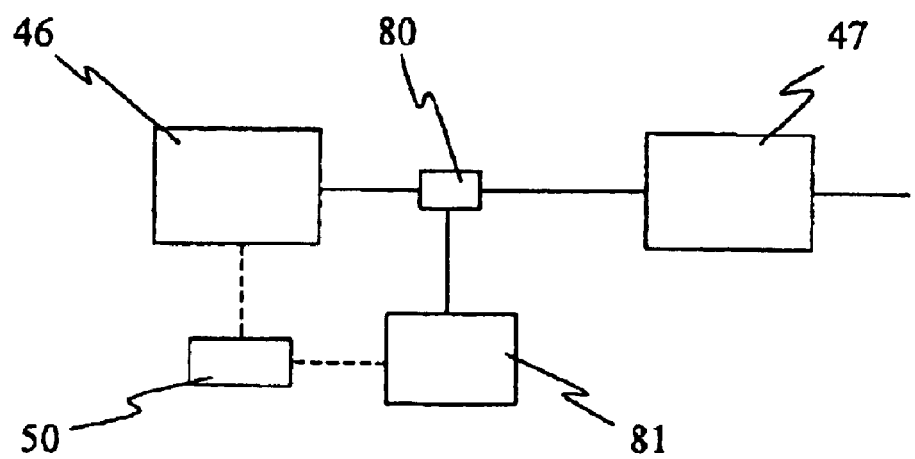
FIG. 21 schematically shows a feedback circuit for controlling the emission wavelength of a laser source according to prior art.

Typically, the control of the emission wavelength of the laser 46 is made by splitting a small portion of the unmodulated signal emitted by the laser 46 in the path between the same laser and the external modulator, as schematically shown in FIG. 21. The splitter 80 takes a portion of the optical signal towards a device 81 known as "wavelength locker", which gives as output an electrical signal to be fed to the wavelength controlling circuit 50 of the laser 46.

Figure 22:
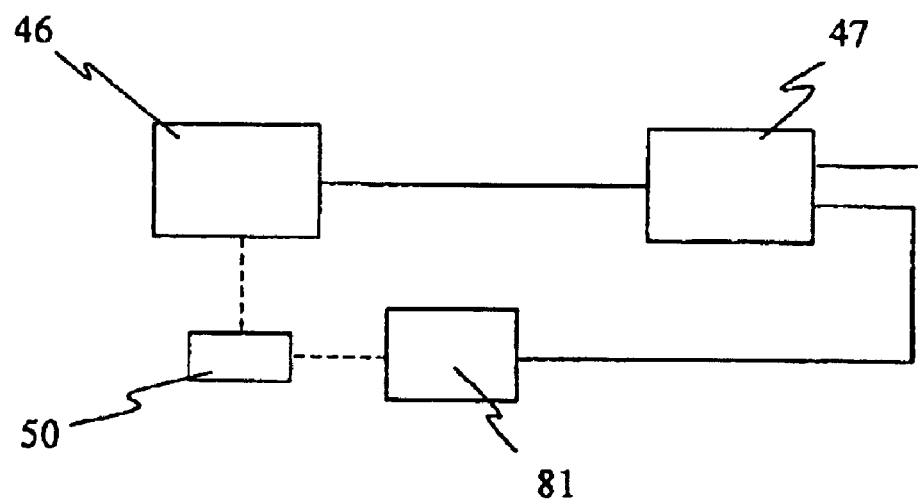
FIG. 22 schematically shows a feedback circuit for controlling the emission wavelength of a laser source according to the present invention.

Using the configuration of the modulator with integrated attenuator 47 according to the first embodiment, a splitting of the unmodulated signal exiting by laser 46 is done in the Y-branch 48. With reference to FIGS. 7, 10 or 11, by conveying the portion of the optical signal coupled by second waveguide arm 23b and exiting from the dummy waveguide 27, for example by a suitably attached optical fibre (not shown) aligned with the output of the dummy waveguide 27, it is possible to make the feedback control without using a coupler in the path between the laser and the external modulator. As schematically shown in FIG. 22, the output of the second portion of the optical signal is connected with the wavelength locker 81, so as to close the feedback loop for the emission wavelength of the laser 46.

Alternatively, if the dummy waveguide 27 is not present, the portion of the optical signal diverted through the second waveguide arm 23b of the Y-branch 48 is lost: a filtering metal strip or other suitable absorbing material can be deposited at the end of the same 23b, for removing from the substrate that portion of optical signal not used. In this case, the feedback control shown in FIG. 21 can be used.

Figure 14:
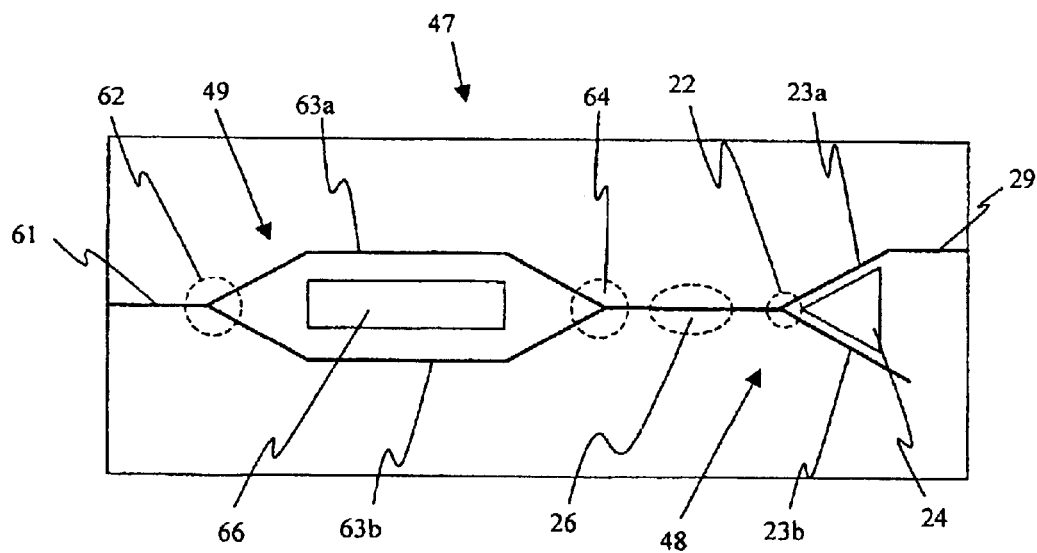
FIG. 14 schematically shows a second embodiment of a modulator with integrated attenuator, with a Mach-Zehnder modulator upstream with respect to a Y-branch attenuator.

Second embodiment: with reference to FIG. 14, a second embodiment of the modulator with integrated attenuator 47 is schematically shown, comprising a Y-branch attenuator 48 downstream with respect to a Mach-Zehnder modulator 49. A unique electrode 66 is used in modulator 49, for both RF and bias. For the sake of clarity, ground electrodes are not represented in the drawing, but it has to be intended that each of the two integrated components has its complete set of electrodes. Same numeral references used in previous figures are adopted wherever possible for similar parts.

In the second embodiment, the optical signal is first modulated in Mach-Zehnder modulator 49 and then enters in the attenuator 48 through connecting waveguide 26. Here, the modulated signal is splitted in the two waveguide branches 23a, 23b in a ratio depending on the voltage applied to the central electrode 24. One of the branches 23a, 23b, for example waveguide branch 23a, is chosen as output of the device 47 and guides the portion of modulated signal towards the end of the chip through output waveguide 29. The remaining portion of the modulated signal is diverted away by second waveguide branch 23b.

Applicant has observed a great degradation of ER until values down to 10 dB in some examplary devices realized according to this second embodiment. Thus, in such case, very strong crosstalk between the two integrated devices is involved, leading to an unpractical use of the device in WDM system.

Applicant has made the hypothesis that this very strong crosstalk was caused in part by the mutual proximity of the two multimodal regions 64, 22, respectively belonging to the Mach-Zehnder modulator 49 and to the Y-branch attenuator 48, due to the spreading of radiation on the substrate in the region between the two integrated devices 49, 48 starting from the multimodal region 64.

In particular, when a minimum of interference between the signals travelling in waveguide arms 63a, 63b of the Mach-Zehnder modulator 49 is reached, that is when the modulator reaches the extinction condition, part of the radiation spread on the substrate starting from the second junction 64 (as discussed above with reference to the Mach-Zehnder modulator) may be coupled again in the subsequent waveguides forming the attenuator 48, in particular in the subsequent multimodal region corresponding to junction 22, thus leading to a rise of the minimum optical intensity of the whole device 47.

Further, a fraction of optical power associated with radiated modes of propagation is re-coupled, though strongly attenuated, in the waveguide 26 and arrives to the multimodal region 22 of the Y-branch attenuator 48, possibly contributing to the rise of the minimum optical intensity.

Both these phenomena depend from the cut-off wavelength of the connecting waveguide 26.

In principle the problem could be solved by keeping the two facing multimodal regions 64, 22 sufficiently far, so that the fraction of optical power associated with higher order modes remaining in the connecting waveguide 26 is sufficiently attenuated and the spreading angle of the radiation propagating on the substrate between the two integrated devices 49, 48 does not intersect the waveguides of the Y-branch attenuator 48. This solution has the disadvantage that the chip can become too long, as will be clarified below with reference to an example.

Applicant has understood that some of the solutions applied for solving crosstalk problems in the first embodiment can also be applied for solving the problem related to the second embodiment.

In particular, filtering metal strips can be applied laterally with respect to the connecting waveguide 26, so as to substantially reduce or eliminate the radiation spreading on the substrate between the two integrated devices 49, 48.

Reducing the width of the connecting waveguide 26, or generally reducing the cut-off value of the waveguide 26 for the radiated modes, can be also applied for causing the radiation spreading on the substrate between the two integrated devices to irradiate with a much opened aperture angle. In such way, the coupling of this radiation in the subsequent waveguides belonging to the attenuator 48 can be substantially reduced. Additionally, reducing of the width of the connecting waveguide 26 advantageously increases the attenuation of the optical power associated with the radiated modes which propagates in the waveguide itself.

Both the solutions can be advantageously used for keeping closer the two integrated devices 48, 49 on a short chip with a reduced crosstalk level.

EXAMPLE 6

As an example, in a simulation test the Applicant has evaluated what distance has to be kept between the two facing multimodal regions 64, 22 of the integrated devices 48, 49 in the second embodiment, that is what can be the length of the connecting waveguide 26, by comparing a case in which the width of the connecting waveguide 26 was 6 $\mu$m with a case in which the width of the connecting waveguide 26 was 5.5 $\mu$m. The width of the waveguides forming the modulator 49 and the attenuator 48 was 6 $\mu$m. For both cases, it has been simulated, by means of a suitable computer program, the introduction of an optical signal in the modulator 49 kept at the extinction condition, which corresponds to the application of an optical signal lying on the first higher order mode of propagation to the multimodal region 64 of the modulator 49. Then, an evaluation of the optical power of the portion of radiation exiting by the two waveguide arms 23a, 23b of the attenuator 48 was performed, in order to determine the portion of the optical power spread on the substrate from the multimodal region 64 and coupled in the waveguides forming the attenuator 48. The simulation test was carried out with many lengths of the connecting waveguide 26, ranging from 1 mm to 15 mm, in order to have many statistical points. From the measure of the optical power exiting from the waveguide arms 23a, 23b an attenuation coefficient related to the first higher order mode was then calculated for the two cases.

The result of the simulation was that with a width of the connecting waveguide 26 of 6 μm the attenuation coefficient was 11.7 dB/cm, whereas with a width of the connecting region 26 of 5.5 μm the attenuation coefficient was 38.5 dB/cm.

Thus, by fixing an appropriate attenuation level for the first order mode, in order to have a reduced crosstalk level between the two integrated devices 48, 49, a length of a suitable connecting waveguide 26 can be easily evaluated. For example, by fixing a desired attenuation level of 40 dB, with a width of 6 μm a length of at least 3.4 cm has to be used; with a width of 5.5 μm a length of some more than 1 cm can be used, advantageously allowing the integration on a shorter chip.

Figure 15:
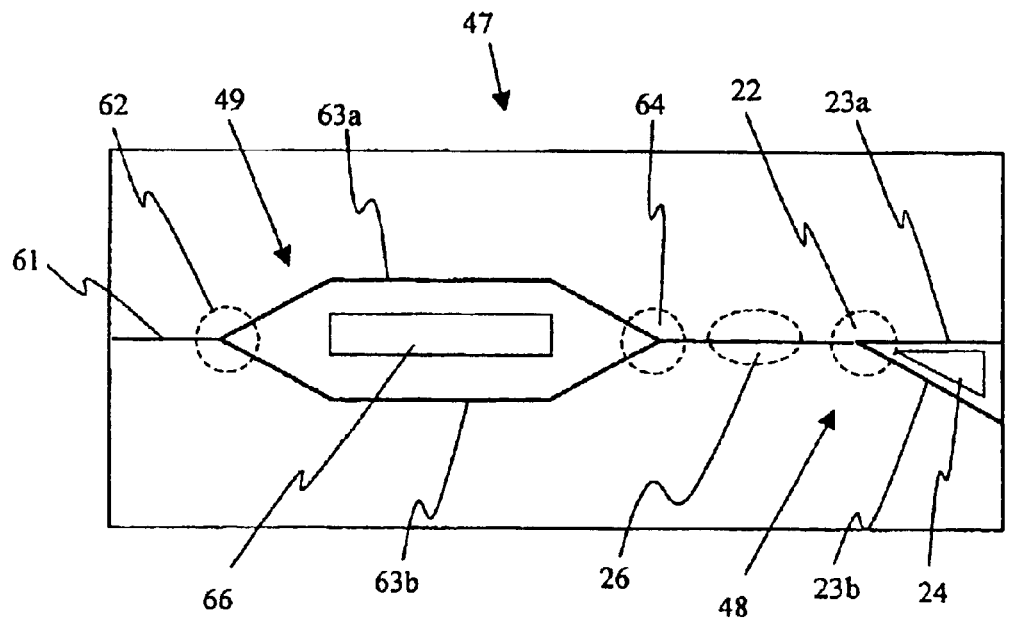
FIG. 15 schematically shows an example of modulator with integrated attenuator according to the second embodiment using a tilted Y-branch attenuator.

A configuration including a tilted Y-branch, as schematically shown in FIG. 15, can also be applied in the second embodiment. In this configuration, waveguide arm 23a, that is the output of the device 47, is directed parallel to a longitudinal direction. This fact has the advantage that no curved sections are introduced by the attenuator 48 in the path of the optical signal: thus, the two facing multimodal regions 64, 22 can be put mutually far away as much as possible, compatibly with the geometrical dimensions of the substrate and of the integrated devices 48, 49. Application of filtering metal strips between the two multimodal regions 64, 22 on both sides of the connecting waveguide 26, together or in alternative to reduction of the width of the connecting waveguide 26 may still be applied in the configuration of FIG. 15, in order to advantageously reduce the distance between the two multimodal regions 64, 22, thus allowing integration on a shorter substrate.

Figure 16:
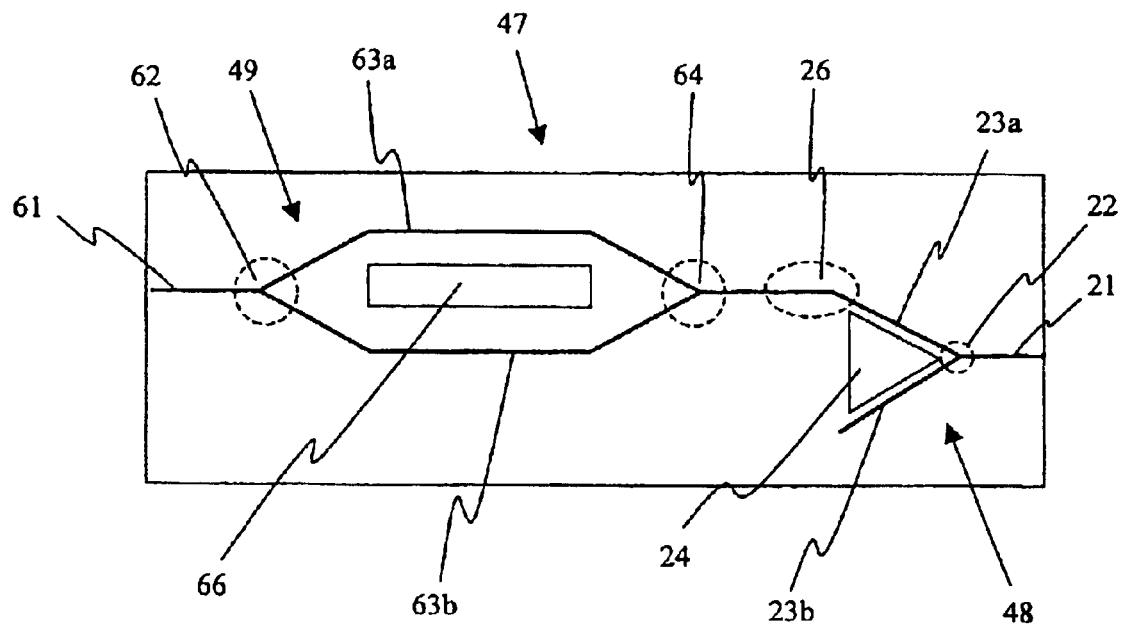
FIG. 16 schematically shows a third embodiment of a modulator with integrated attenuator, with a Mach-Zehnder modulator upstream with respect to a reversed Y-branch attenuator.

Third embodiment: the third embodiment differs from the already described first embodiment in that the direction of the inserted optical signal is reversed. As schematically shown in FIG. 16 (which substantially corresponds to FIG. 7 seen from the right to the left), the integrated device 47 comprises a modulator 49 upstream with respect to a reversed Y-branch attenuator 48, optically connected by a connecting waveguide 26. In the third embodiment, an optical signal is inserted in input waveguide 61, modulated by Mach-Zehnder modulator 49, guided towards one of the arms 23a of the reversed Y-branch attenuator 48 by means of the connecting waveguide 26 and exits from output waveguide 21. As previously explained with reference to the reversed use of the Y-branch attenuator, the attenuation level of the optical signal propagating in the attenuator 48 is still determined by the DC voltage applied to the central electrode 24, that acts on the ratio between the optical power resting on the fundamental propagation mode (guided by output single mode waveguide 21) and the optical power transferred on the first order propagation mode (which is radiated on the substrate) at the exit of the multimodal region 22 of the attenuator 48.

As discussed for the previous embodiments, it will be readily appreciated that the problem related with the third embodiment is that a portion of radiation spreading on the substrate in the region between the two integrated devices 49, 48, starting from the multimodal region 64 when the modulator 49 is at the extinction condition or starting from the curved waveguide 26, may be coupled in the waveguides forming the attenuator 48, in particular in the multimodal region 22, thus causing crosstalk.

In this respect, it has to be noted that the radiation spreading on the substrate is a continuous spectrum of symmetric and anti-symmetric "modes" of propagation. For example, in the multimodal region 22 a symmetric mode of the continuous spectrum can couple a portion of optical power on the fundamental mode of propagation, which is guided by the subsequent single-mode output waveguide 21. Then, when ideally the modulator is at the extinction condition, the minimum transmissivity is actually enhanced.

As it can be inferred by FIG. 16 the choice of disposing the Y-branch attenuator 48 in the "reversed direction" on the substrate allows a greater mutual separation of the multimodal regions 64, 22, with respect to the embodiment shown in FIG. 14, of a length at least equal to the Y-branch attenuator geometrical length. In such way the optical power of a remaining portion of radiation spreading on the substrate and arriving to the multimodal region 22 and to the output waveguide 21 is lowered in the configuration of FIG. 16 with respect to configuration of FIG. 14. Thus, the configuration of FIG. 16 with the reversed Y-branch attenuator 48 put after the Mach-Zehnder modulator 49 can reach the required ER values.

Figure 17:
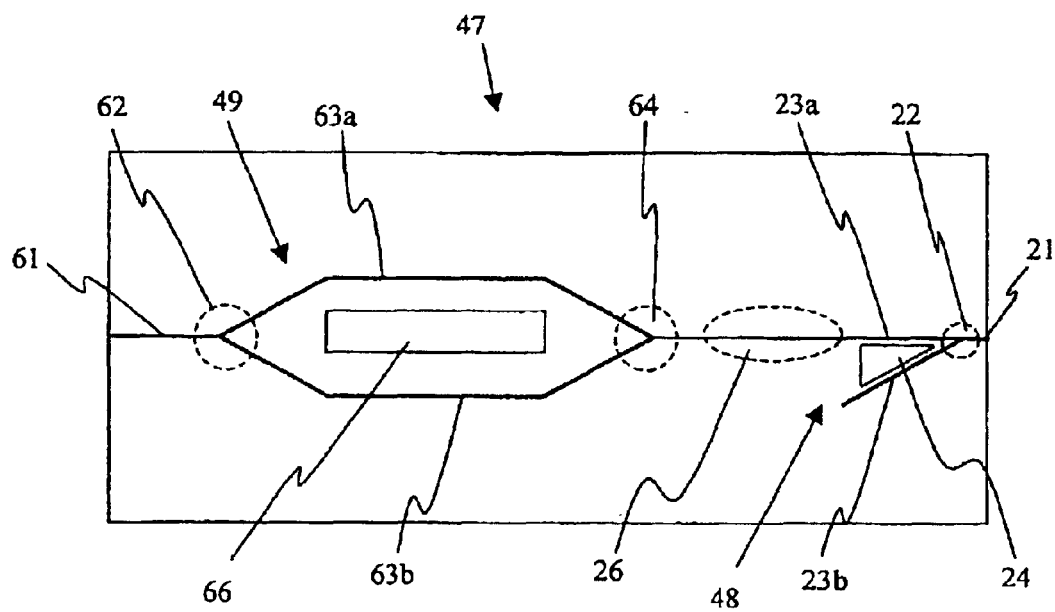
FIG. 17 schematically shows an example of a modulator with integrated attenuator according to the third embodiment, using a tilted reversed Y-branch attenuator.

A configuration including a tilted reversed Y-branch, as shown in FIG. 17 (which substantially corresponds to FIG. 10 seen from the right to the left), can also be used for this embodiment, allowing the elimination of curved sections in the connecting waveguide 26. This has the further advantages of reducing propagation losses and allowing use of a shorter chip length.

Addition of filtering metal strips may still apply to this embodiment in order to effectively reduce the radiation spreading on the substrate in the region between the two integrated devices 49, 48.

The three solutions may also be applied together on a single device as described in the following example 7.

EXAMPLE 7

The exemplary device previously described in example 3 (see first embodiment discussion) with the tilted Y-branch attenuator was tested by the Applicant with the experimental setup of FIG. 8 simply by reversing the device during the experiment.

Figure 18:
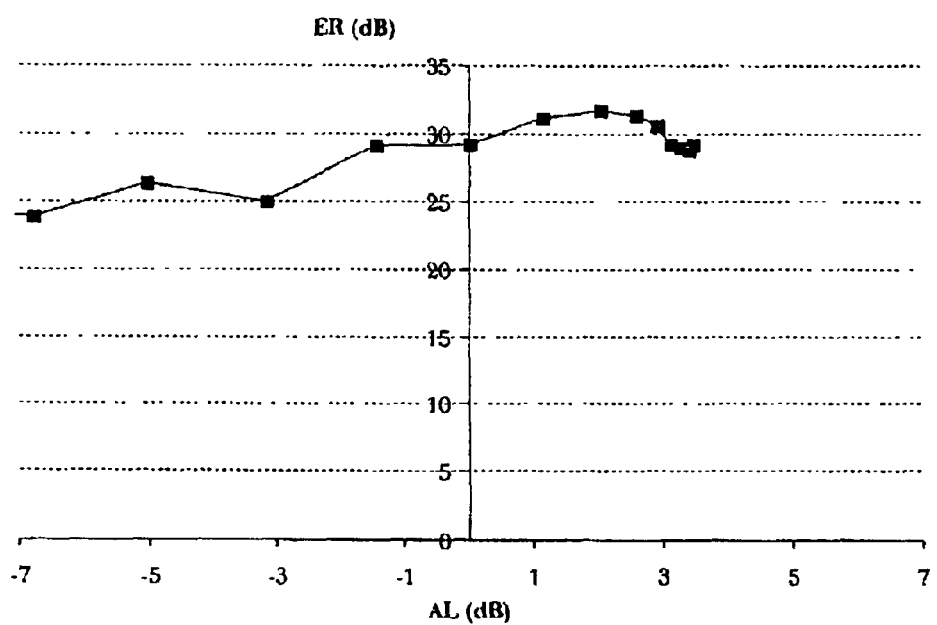
FIG. 18 shows a plot of the extinction ratio vs. the attenuation range of an example of modulator with integrated attenuator realized according to FIG. 17.

FIG. 18 shows the resulting graph. As it can be seen, a very good result of ER is obtained.

Fourth embodiment: the fourth embodiment differs from the already described second embodiment in that the direction of the inserted optical signal is reversed.

Figure 19:
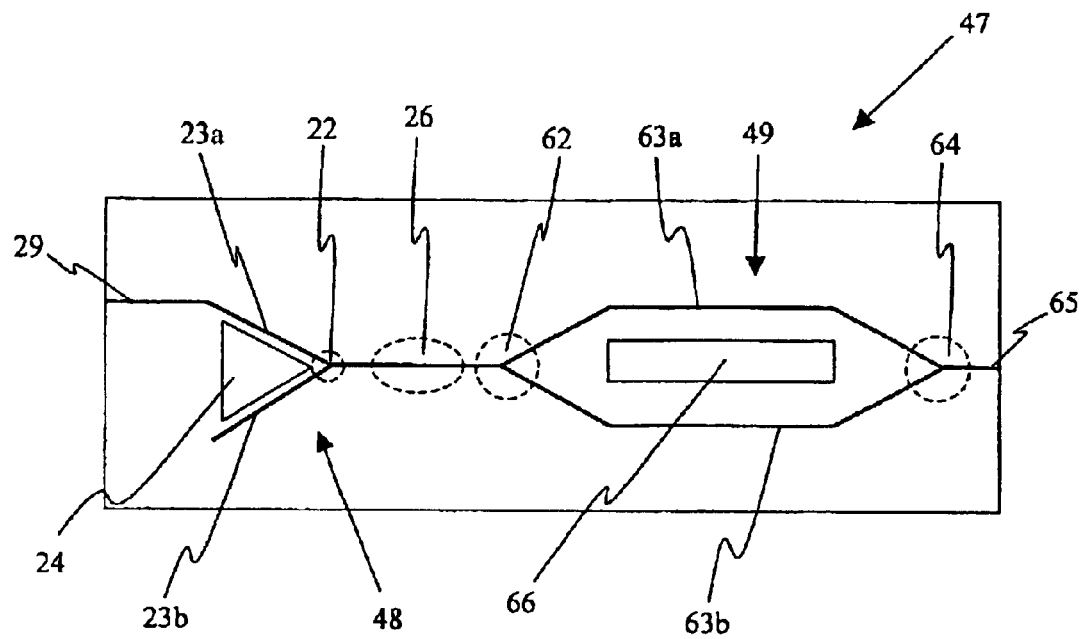
FIG. 19 schematically shows a fourth embodiment of a modulator with integrated attenuator, with a Mach-Zehnder modulator downstream with respect to a reversed Y-branch attenuator.

As schematically shown in FIG. 19, (which substantially corresponds to FIG. 14 seen from the right to the left), the integrated device 47 comprises a reversed Y-branch attenuator 48 upstream with respect to a Mach-Zehnder modulator 49, optically connected by a waveguide 26.

In the fourth embodiment, an optical signal is inserted by an input waveguide 29 in one of waveguide arms of the attenuator 48, for example arm 23a, suitably attenuated by passing through multimodal region 22, then transmitted to the interferometric structure forming the modulator 49, through connecting waveguide 26. Here the attenuated optical signal is modulated and then it exits from the device 47 through output waveguide 65.

As discussed for the previous embodiments, it will be readily appreciated that the problem related with the fourth embodiment is that the portion of optical power which is coupled to the first higher order mode of propagation in the multimodal region 22 of the attenuator 48 is spread on the substrate in a continuous spectrum of radiated modes due to the single-mode behaviour of the connecting waveguide 26 and may be coupled in the waveguides forming the interferometric structure of the modulator 49, in particular in the first multimodal region 62.

That is, the problem related with the fourth embodiment is similar to the problem related to the second embodiment.

Figure 20:
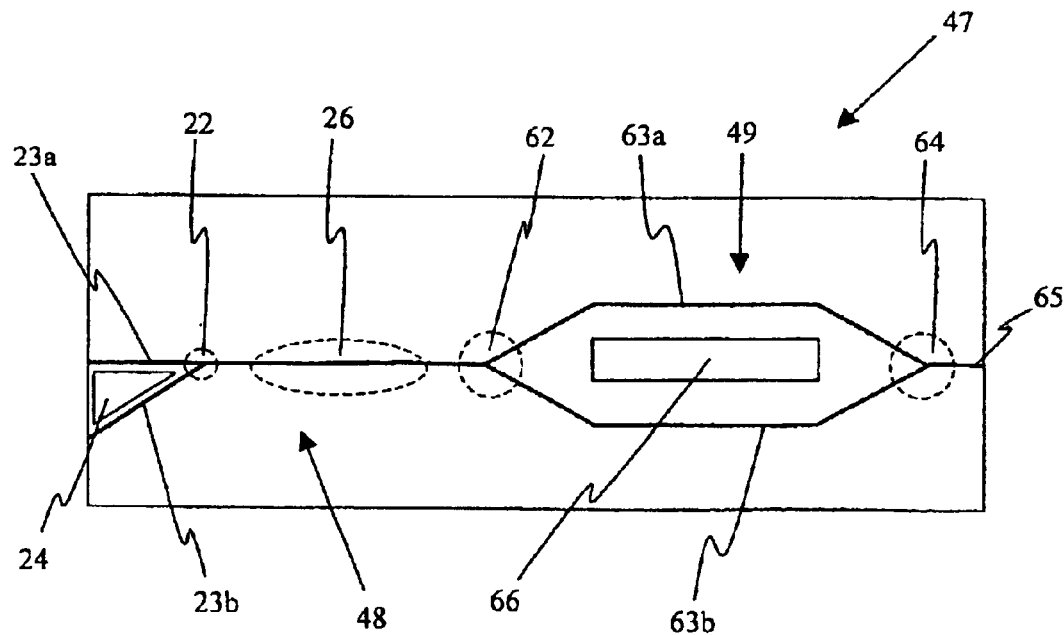
FIG. 20 schematically shows an example of modulator with integrated attenuator according to the fourth embodiment using a tilted Y-branch attenuator.

Thus, solutions indicated in the second embodiment apply also for the fourth embodiment. In particular, a configuration including a tilted Y-branch attenuator 48, as schematically shown in FIG. 20 (which substantially corresponds to FIG. 15 seen from the right to the left) may be adopted in order to eliminate curved sections in the optical path of the optical signal, with the possibility of keeping the two facing multimodal regions 22, 64 mutually far away as much as possible, depending on the geometrical dimensions of the substrate and of the two integrated devices 48, 49.

The embodiments of the modulator with integrated attenuator 47 presented above meet the requirements for use in a WDM or DWDM system using de-emphasis of the channels at the transmitting station, as system 100 in FIG. 1. Values of extinction ratio well over 20–25 dB were obtained, corresponding to a very low level of crosstalk between the two integrated devices 48, 49, over the whole attenuation range of interest.

The integration of the two devices on the same substrate allows use of a short chip: this is very important in a complex device as a transponder (FIG. 2), where many components have to be assembled and packaged together in a limited space. In this respect, the choice of the Y-branch 48 as attenuator is advantageous since the Y-branch is a very compact and short device. Although the driving voltage is relatively high for a Y-branch attenuator (e.g., ±26 V), its characteristic curve is a monotone function, which allows use of a simple electronic control circuit for effectively controlling the attenuation applied to the various channels.

In particular, an embodiment comprising a Mach-Zehnder modulator coupled to one arm of the Y-branch attenuator, such as the first or the third embodiment above discussed, is effective for obtaining a reduced crosstalk between the two devices, as well as integration on a short chip.

Advantageously, the first embodiment above discussed with reference to FIGS. 7, 10, 11, allows use of the portion of the optical signal diverted through the "dummy" waveguide 27 for the feedback control circuit of the wavelength of the channel, thus rendering unnecessary the use of a further component in the transponder for realizing the feedback.

What is claimed is:

1. An integrated optical device comprising: a planar substrate, a Mach-Zehnder modulator integrated on said substrate characterized in that it further comprises a Y-branch optical attenuator integrated on said substrate to provide an attenuation range, said Y-branch attenuator being optically coupled to said Mach-Zehnder modulator, and means for reducing a crosstalk between said Y-branch attenuator and said Mach-Zehnder modulator, whereby the extinction ratio of the optical device is at least 18 dB on an attenuation range of at least 6 dB.

2. An integrated optical device as in claim 1, characterized in that the extinction ratio of the optical device is at least 20 dB on an attenuation range of at least 6 dB.

3. An integrated optical device as in claim 1, characterized in that said Mach-Zehnder modulator is optically coupled to one arm of said Y-branch attenuator.

4. An integrated optical device as in claim 1, characterized in that said Mach-Zehnder modulator is optically coupled to the common waveguide of said Y-branch attenuator.

5. An integrated optical device as in claim 1, characterized in that said means for reducing comprises one arm of said Y-branch attenuator disposed parallel with respect to a longitudinal direction.

6. An integrated optical device as in claim 1, characterized in that said means for reducing comprises a filter of an unguided radiation spreading on said substrate, the filter being arranged in a region between said Y-branch attenuator and said Mach-Zehnder modulator.

7. An integrated optical device as in claim 6, characterized in that said filter comprises metal strips disposed on the side of a connecting optical waveguide coupling said Y-branch attenuator and said Mach-Zehnder modulator.

8. An integrated optical device as in claim 7, characterized in that a gap between said metal strips is about 170% of the MFD of said connecting optical waveguide.

9. An integrated optical device as in claim 7, characterized in that the length of said metal strips is about 4 mm.

10. An integrated optical device as in claim 7, characterized in that said metal strips are integrated in an extension of the electrodes of said Y-branch attenuator, so that the gap between said electrodes progressively increases from about 100% to about 170% of the MFD of said optical waveguide in a first portion of said extension and is about 170% of the MFD of said optical waveguide in a second portion of said extension.

11. An integrated optical device as in claim 10, characterized in that said second portion of said extension has a length of about 4 mm.

12. An integrated optical device as in claim 1, characterized in that said means for reducing comprises waveguides for said Y-branch attenuator having a width lower between 5% and 16% with respect to the width of the waveguides of said Mach-Zehnder modulator.

13. An integrated optical device as in claim 12, characterized in that the width of the waveguides of said Y-branch attenuator is 8% less than the width of the waveguides of said Mach-Zehnder modulator.

14. An integrated optical device comprising: a substrate, a Mach-Zehnder modulator integrated on said substrate characterized in that it further comprises a Y-branch attenuator integrated on said substrate, said Mach-Zehnder modulator being optically coupled to one arm of said Y-branch attenuator.

15. An integrated optical device as in claim 14, characterized in that integrated optical device comprises a means for reducing a crosstalk between said Y-branch attenuator and said Mach-Zehnder modulator.

16. A method for reducing the crosstalk between at least two devices including optical waveguides integrated on a substrate, each of said optical devices including at least one multimodal section of optical waveguide, said crosstalk being generated by unguided optical radiation propagating on said substrate in a region comprised between said optical devices, said method comprising:

integrating a Mach-Zehnder modular and a Y-branch attenuator on said substrate thereby defining said region; and filtering said unguided radiation in said region.

17. A transmitting module comprising: a laser source for emitting an optical signal, an integrated optical device for modulating the intensity of said optical signal, comprising a Mach-Zehnder modulator formed on a substrate, characterized in that said integrated optical device further comprises a Y-branch optical attenuator formed on said substrate optically coupled to said modulator, to provide an attenuation range, and means for reducing a crosstalk between said Y-branch attenuator and said Mach-Zehnder modulator, whereby the extinction ratio of the optical device is at least 18 dB on an attenuation range of at least 6 dB.

18. A transmitting module comprising: a laser source for emitting an optical signal, an integrated optical device for modulating the intensity of said optical signal, comprising a Mach-Zehnder modulator formed on a substrate, characterized in that said integrated optical device further comprises a Y-branch optical attenuator formed on said substrate, and said Mach-Zehnder modulator is optically coupled to one arm of said Y-branch attenuator.

19. A transmitting module as in claim 18, characterized in that said Y-branch attenuator is located upstream with respect to said Mach-Zehnder modulator.

20. A transmitting module as in claim 18, characterized in that said Y-branch attenuator is located downstream with respect to said Mach-Zehnder modulator.

21. A transmitting module comprising:

a laser source for emitting an optical signal; and an integrated optical device for modulating the intensity of the optical signal, comprising:
  a Mach-Zehnder modulator formed on a substrate;
  a Y-branch optical attenuator formed on the substrate, wherein the Mach-Zehnder modulator is optically coupled to a first arm of the Y-branch attenuator and the Y-branch attenuator is located upstream with respect to said Mach-Zehnder modulator;
  a dummy waveguide coupled to a second arm of the Y-branch attenuator; and
  a feedback circuit optically connected to the dummy waveguide, the feedback circuit comprising electrical control circuits for controlling the wavelength of the emitted signal.

* * * * *